US012269258B2

(12) United States Patent
Kobayashi

(10) Patent No.: US 12,269,258 B2

(45) Date of Patent: Apr. 8, 2025

(54) LIQUID EJECTING DEVICE, AND LIQUID EJECTING METHOD

(71) Applicant: SEIKO EPSON CORPORATION, Tokyo (JP)

(72) Inventor: Satoru Kobayashi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 181 days.

(21) Appl. No.: 18/067,040

(22) Filed: Dec. 16, 2022

(65) Prior Publication Data

US 2023/0191806 A1 Jun. 22, 2023

(30) Foreign Application Priority Data

Dec. 16, 2021 (JP) ................................ 2021-204008

(51) Int. Cl.
*B41J 11/00* (2006.01)

(52) U.S. Cl.
CPC .................................. *B41J 11/006* (2013.01)

(58) Field of Classification Search
CPC ... B41J 11/006; B41J 11/0015; B41J 11/0095; B41J 2/16517; B41J 2/16526; B41J 2/16529; B41J 2203/01; B41J 2/2114; B41J 2/17; B41J 2/04503; B41J 2/04505; B41J 2/04506; B41J 2/04508; B41J 2/04553; B41J 2/04555; B41J 2/04556; B41J 2/04558; B41J 2/0456; B41J 2/04561; B41J 2/04563; B41J 2/04565; B41J 2/04566
See application file for complete search history.

(56) References Cited

U.S. PATENT DOCUMENTS

2012/0127231 A1 5/2012 Nukui
2013/0076826 A1 3/2013 Nukui
2013/0215193 A1 8/2013 Nukui
2013/0293622 A1 11/2013 Nukui et al.

FOREIGN PATENT DOCUMENTS

JP 2013082195 A 5/2013
JP 2013169730 A 9/2013
JP 2013233676 A 11/2013

*Primary Examiner* — Kristal Feggins

(74) *Attorney, Agent, or Firm* — CHIP LAW GROUP

(57) ABSTRACT

A liquid ejecting device performing printing by ejecting liquid onto a medium in a printing region, the liquid ejecting device including an ejecting unit including a first ejecting unit ejecting the liquid onto the medium, and a second ejecting unit ejecting a reaction liquid containing a coagulant for coagulating a component in the liquid, a transport unit configured to transport the medium, a jam detector configured to detect a jam of the medium, and a control unit configured to control the ejecting unit, and the transport unit, wherein when the jam is detected in the jam detector, the control unit causes the transportation of the medium by the transport unit to stop, and causes the liquid, the reaction liquid, or the liquid and the reaction liquid to be ejected in the printing region from the first ejecting unit, and the second ejecting unit.

10 Claims, 10 Drawing Sheets

LIQUID EJECTING DEVICE, AND LIQUID EJECTING METHOD

The present application is based on, and claims priority from JP Application Serial Number 2021-204008, filed Dec. 16, 2021, the disclosure of which is hereby incorporated by reference herein in its entirety.

BACKGROUND

1. Technical Field

The present disclosure relates to a liquid ejecting device and a liquid ejecting method.

2. Related Art

A liquid ejecting device that ejects ink, and a reaction liquid containing a coagulant that coagulates the ink has been known. A printer described in JP 2013-82195 A ejects ink with a recording head and ejects a processing liquid with a processing liquid head. The processing liquid coagulates or precipitates a colorant in the ink. When a jam occurs in a recording medium, the printer described in JP 2013-82195 A measures a jam period until recovery from the jam. The jam period is measured by detecting a jam processing completion signal. The printer described in JP 2013-82195 A controls a forced emission mechanism according to the measured jam period.

In the printer described in JP 2013-82195 A, there is a possibility that the ink reacts with the processing liquid, which is a reaction liquid, on a head ejection surface, after the jam occurrence, until detection of the jam processing completion signal. When the ink and the processing liquid react on the head ejection surface or in a nozzle, there is a possibility that a coagulate is generated and the nozzle is clogged.

SUMMARY

A liquid ejecting device of the present disclosure is a liquid ejecting device that performs printing by ejecting liquid onto a medium within a printing region, the liquid ejecting device including an ejecting unit including a first ejecting unit ejecting the liquid onto the medium, and a second ejecting unit ejecting a reaction liquid containing a coagulant for coagulating a component in the liquid, a transport unit configured to transport the medium, a jam detector configured to detect a jam of the medium, and a control unit configured to control the ejecting unit, and the transport unit, wherein when the jam is detected by the jam detector, the control unit stops the transportation of the medium by the transport unit, and ejects, within the printing region, the liquid, the reaction liquid, or the liquid and the reaction liquid from the first ejecting unit and the second ejecting unit.

A liquid ejecting method for the present disclosure is a liquid ejecting method for a liquid ejecting device performing printing by ejecting liquid onto a medium within a printing region, the liquid ejecting method including ejecting the liquid onto the medium from a first ejecting unit, ejecting, from a second ejecting unit onto the medium, a reaction liquid containing a coagulant for coagulating a component in the liquid, and stopping transport of the medium, and ejecting the liquid, the reaction liquid, or the liquid and the reaction liquid when a jam of the medium is detected.

DESCRIPTION OF EXEMPLARY EMBODIMENTS

Figure 1:
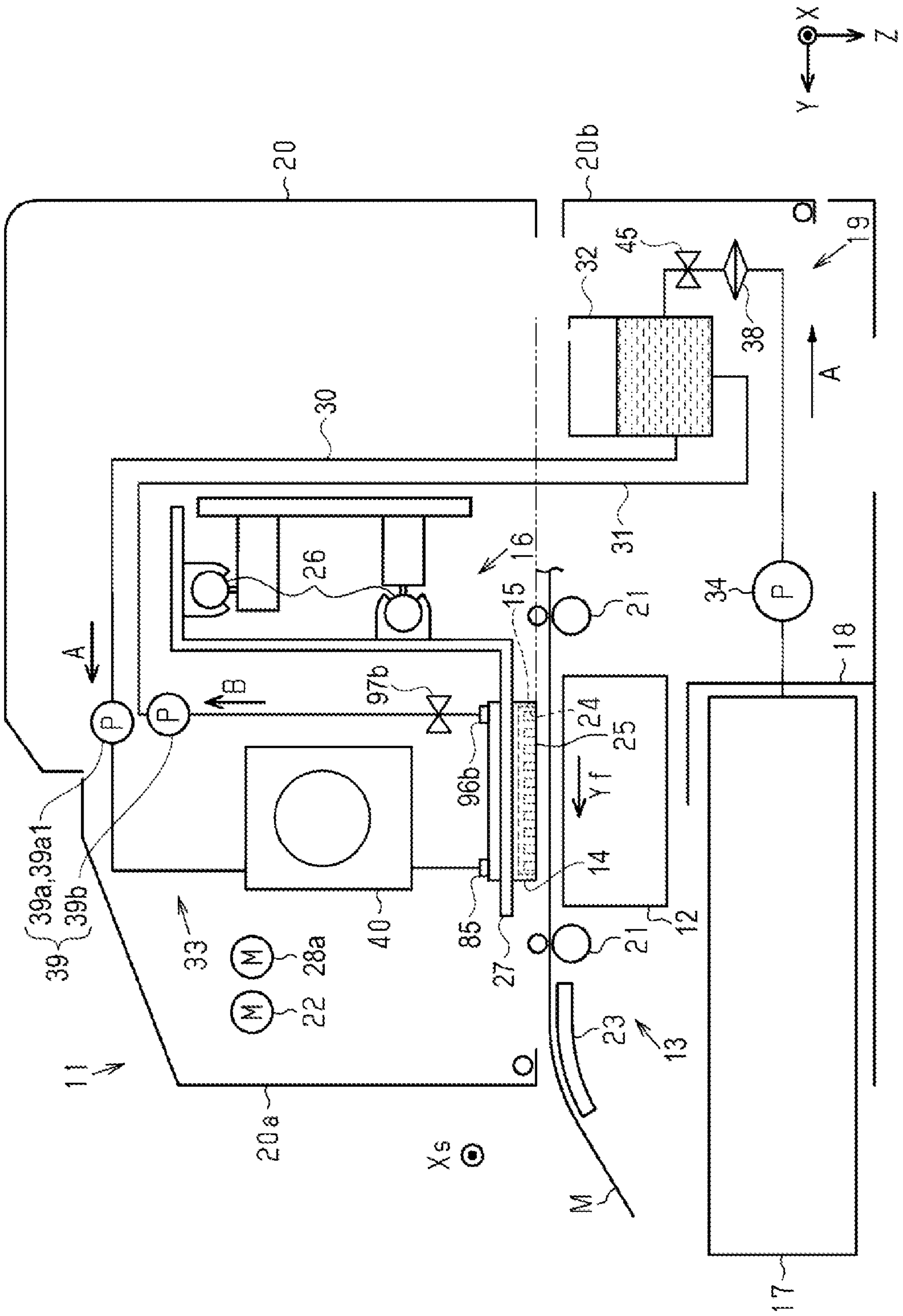
FIG. 1 is a diagram illustrating a schematic configuration of a printer as viewed from a +X direction.

FIG. 1 illustrates a schematic configuration of a printer 11 as viewed from the +X direction. FIG. 1 illustrates the printer 11 of an ink jet-type that performs printing on a printing medium M. The printing medium M is, for example, fabric of cotton, silk, wool, polyester, or the like. The printer 11 corresponds to an example of a liquid ejecting device. The printing medium M corresponds to an example of a medium.

Some figures including FIG. 1 each illustrate an XYZ coordinate system. An X-axis, a Y-axis, and a Z-axis are mutually orthogonal. The X-axis is parallel to an installation surface of the printer 11. The X-axis is an axis parallel to a scanning direction Xs of a head unit 14 described below. A direction heading from a front toward a back of FIG. 1 is a −X direction. A direction heading from the back toward the front of FIG. 1 is a +X direction. The Y-axis is parallel to the installation surface of the printer 11. The Y-axis is an axis orthogonal to the scanning direction Xs of the head unit 14. A direction heading from left to right of the printer 11 illustrated in FIG. 1 is a −Y direction. A direction heading from right to left of the printer 11 illustrated in FIG. 1 is a +Y direction. The Z-axis is an axis orthogonal to the installation surface of the printer 11. A direction heading upward from the installation surface is a −Z direction. A direction heading from above toward the installation surface is a +Z direction.

The printer 11 includes a main body 20, a first cover **20*a*, and a second cover 20*b*. The main body 20 is constituted by a housing, a frame, or the like. The first cover 20*a* and the second cover 20*b* are attached to the main body 20 so as to be openable and closable. The first cover 20*a* is provided so as to cover a part of a movement path of the head unit 14** described later.

The printer 11 illustrated in FIG. 1 includes a support 12, a transporting unit 13, the head unit 14, and a movement mechanism 16. The support 12 supports the printing medium M. The transporting unit 13 transports the printing medium M. The head unit 14 ejects ink or processing liquid toward the printing medium M supported by the support 12. The movement mechanism 16 moves the head unit 14 in the scanning direction Xs, or in a direction reverse of the scanning direction Xs.

The support 12 is disposed at a position facing the head unit 14 via the printing medium M. A width parallel to the X-axis of the support 12 is greater than a width of the printing medium M. A length parallel to the Y-axis of the support 12 is greater than a length along the Y-axis of the head unit 14.

The transporting unit 13 includes a transport roller pair 21, a transport motor 22, and a guide plate 23. The transport roller pair 21 includes two rollers. The transport roller pair 21 sandwiches and transports the printing medium M. In the printer 11, a plurality of the transport roller pairs 21 may be provided along a transport path of the printing medium M. The printer 11 illustrated in FIG. 1 includes two sets of the transport roller pairs 21. The transport motor 22 is coupled to the transport roller pair 21 via a drive transmission mechanism (not illustrated). The transport motor 22 transmits drive force via the drive transmission mechanism, and rotates the transport roller pair 21. The guide plate 23 guides the printing medium M. The transporting unit 13, by driving the transport motor 22, transports the printing medium M along a surface of the support 12. The transporting unit 13 transports the printing medium M in a transport direction Yf illustrated in FIG. 1. The transport direction Yf illustrated in FIG. 1 is a direction parallel to the Y-axis at a printing position where the head unit 14 prints on the printing medium M. The transporting unit 13 corresponds to an example of a transport unit.

The movement mechanism 16 includes a guide shaft 26, a carriage 27, and a carriage motor 28*a*. The guide shaft 26 is provided along the scanning direction Xs. The carriage 27 holds the head unit 14 in a replaceable manner. The carriage 27 holds the head unit 14 in posture where a nozzle surface 25 faces the support 12. The carriage motor 28*a* moves the carriage 27 along the guide shaft 26.

The movement mechanism 16 moves the carriage 27 and the head unit 14 along the guide shaft 26 in the scanning direction Xs and a direction reverse of the scanning direction Xs. The printer 11 illustrated in FIG. 1 is a serial type printing apparatus in which the head unit 14 reciprocates along the X-axis.

The printer 11 includes the head unit 14. The head unit 14 corresponds to an example of an ejecting unit. The head unit 14 includes a plurality of printing heads 15. The plurality of printing heads 15 eject the ink or processing liquid. The ink contains a color material as a component. The ink may contain resin microparticles, organic solvents, surfactants, antioxidants, and the like as components. The printing head 15 includes a plurality of nozzles 24. A first printing head 15*a* described later of the plurality of printing heads 15 ejects a first ink as the ink. The first ink corresponds to an example of liquid. The first printing head 15*a* includes a first nozzle 24*a* that ejects the first ink. The first printing head 15*a* corresponds to an example of a first ejecting unit. A second printing head 15*b* described later of the plurality of printing heads 15 ejects the processing liquid containing a coagulant for coagulating a component in the ink. The coagulant is a polyvalent metal salt, a cationic compound, an organic acid, or the like. The processing liquid may contain two or more types of coagulants. The processing liquid corresponds to an example of a reaction liquid. The second printing head 15*b* includes a second nozzle 24*b* that ejects the processing liquid. The second printing head 15*b* corresponds to an example of a second ejecting unit. The head unit 14 may include a third printing head 15*c*. The third printing head 15*c* ejects a second ink containing a color material different from that of the first ink. The third printing head 15*c* corresponds to an example of a third ejecting unit. The third printing head 15*c* includes a third nozzle 24*c* that ejects the second ink. The second ink corresponds to an example of liquid, and a second liquid. When not distinguished from the first ink, the second ink is simply referred to as the ink. When not distinguished from each other, the first nozzle 24*a*, the second nozzle 24*b*, and the third nozzle 24*c* are each simply referred to as the nozzle 24. The first printing head 15*a*, the second printing head 15*b*, and the third printing head 15*c* have the same structure. FIG. 1 illustrates a configuration of one printing head 15. The plurality of printing heads 15 are disposed along the X-axis.

The printing head 15 includes a supplying port 85, a second discharge port 96*b*, a common flow path, the plurality of nozzles 24, the nozzle surface 25, and an ejecting element 89 described below. The supplying port 85 causes the ink or processing liquid to flow inward the printing head 15. The second discharge port 96*b* causes the ink or processing liquid to flow from the printing head 15. The common flow path not illustrated in FIG. 1 couples the supplying port 85 to the second discharge port 96*b*. The plurality of nozzles 24 are coupled to the common flow path. The nozzle surface 25 is a surface in which the plurality of nozzles 24 open. The ejecting element 89 causes the ink or processing liquid in the nozzle 24 to be ejected. The printing head 15 drives the ejecting element 89 to eject the ink or processing liquid toward the printing medium M located at the printing position, and to print on the printing medium M.

The printer 11 includes a mounting portion 18, and a liquid supply unit 19. A plurality of liquid supply sources 17 accommodating the ink or processing liquid are detachably mounted to the mounting portion 18. The plurality of liquid supply sources 17 are disposed along the X-axis. The liquid supply unit 19 supplies the ink or processing liquid to the printing head 15.

The liquid supply source 17 is, as an example, a container that accommodates the ink or processing liquid. The liquid supply source 17 may be a replaceable cartridge, or may be a tank to which the ink or processing liquid can be replenished.

The liquid supply unit 19 includes a liquid supply flow path 30, a liquid return flow path 31, and a liquid storage unit 32. The liquid supply flow path 30 is coupled to the supplying port 85 so as to be capable of supplying the ink or processing liquid to the printing head 15. The liquid return flow path 31 is coupled to the second discharge port 96*b* so as to be capable of returning the ink or processing liquid supplied to the printing head 15 to the liquid supply flow path 30. The liquid storage unit 32 stores the ink or processing liquid. The liquid return flow path 31 and the liquid supply flow path 30 form a circulation flow path 33. The liquid storage unit 32 is coupled to the liquid supply flow path 30 and the liquid return flow path 31, and is disposed in the circulation flow path 33. The liquid storage unit 32 may be an open tank that opens a space in the liquid storage unit 32 to air, or may be a flexible sealed bag. The printer 11 includes the liquid storage unit 32 at a position where a water level of the ink or processing liquid in the liquid storage unit 32 is below the nozzle surface 25 of the printing head 15. The liquid supply flow path 30 corresponds to an example of a supply flow path. The liquid return flow path 31 corresponds to an example of a return flow path.

The liquid supply unit 19 includes a lead-out pump 34, a filter unit 38, and an opening/closing valve 45, in a flow path between the mounting portion 18 and the liquid storage unit

32. The lead-out pump 34 leads out the ink or processing liquid from the liquid supply source 17. The filter unit 38 captures air bubbles and foreign materials in the ink or processing liquid. The filter unit 38 is detachably mounted to the liquid supply flow path 30. The filter unit 38 is provided at a position that is exposed externally, when a user opens the second cover 20*b*. The opening/closing valve 45 is provided between the lead-out pump 34 and the liquid storage unit 32 in the liquid supply flow path 30. The opening/closing valve 45 is opened when the ink or processing liquid led out by the lead-out pump 34 is supplied toward the printing head 15.

The liquid supply unit 19 includes a liquid flow mechanism 39 and a pressure regulating mechanism 40, between the liquid storage unit 32 and the printing head 15. The liquid flow mechanism 39 causes the ink or processing liquid in the circulation flow path 33 to flow. The pressure regulating mechanism 40 regulates a pressure of the ink or processing liquid to be supplied to the printing head 15.

The liquid flow mechanism 39 includes a supply pump 39*a*, and a return pump 39*b*. The supply pump 39*a* causes the ink or processing liquid in the liquid supply flow path 30 to flow from the liquid storage unit 32 toward the printing head 15. The supply pump 39*a* can pressurize the ink or processing liquid in the printing head 15 by causing the ink or processing liquid in the liquid supply flow path 30 to flow in a supply direction A. The supply pump 39*a* acts as a pressurization mechanism for pressurizing the ink or processing liquid in the printing head 15. The return pump 39*b* causes the ink or processing liquid in the liquid return flow path 31 to flow in a return direction B heading from the printing head 15 toward the liquid storage unit 32. The return pump 39*b* corresponds to an example of a flow mechanism.

It is sufficient that the supply pump 39*a* is a pump that causes the ink or processing liquid in the liquid supply flow path 30 to flow in the supply direction A. The supply pump 39*a* may be a reciprocating pump such as a plunger pump or a diaphragm pump, or a rotary pump such as a gear pump or a tube pump. It is sufficient that the return pump 39*b* is a pump that causes the ink or processing liquid in the liquid return flow path 31 to flow in the return direction B. The return pump 39*b* may be a reciprocating pump such as a plunger pump or a diaphragm pump, or a rotary pump such as a gear pump or a tube pump.

The liquid supply unit 19 includes a second return valve 97*b*. The second return valve 97*b* is provided in the liquid return flow path 31 between the printing head 15 and the liquid storage unit 32. The second return valve 97*b* is provided at a position closer to the second discharge port 96*b* of the printing head 15 than the return pump 39*b* provided in the liquid return flow path 31. The second return valve 97*b* may take a closed-valve state to prevent a flow of the ink or processing liquid in the liquid return flow path 31, and an open-valve state to permit the flow.

The printer 11 includes a plurality of the liquid supply units 19. The plurality of liquid supply units 19 are coupled to the respective printing heads 15. The liquid supply unit 19 coupled to the first printing head 15*a* supplies the first ink to the first printing head 15*a*. The liquid supply unit 19 coupled to the second printing head 15*b* supplies the processing liquid to the second printing head 15*b*. The liquid supply unit 19 coupled to the third printing head 15*c* supplies the second ink to the third printing head 15*c*. The supply pump 39*a* provided in the liquid supply unit 19 coupled to the first printing head 15*a* pressurizes the first ink. The supply pump 39*a* provided in the liquid supply unit 19 coupled to the first printing head 15*a* is denoted as a first supply pump 39*a*1. The first supply pump 39*a*1 corresponds to an example of a first pressurization mechanism. The supply pump 39*a* provided in the liquid supply unit 19 coupled to the second printing head 15*b* pressurizes the processing liquid. The supply pump 39*a* provided in the liquid supply unit 19 coupled to the second printing head 15*b* is denoted as a second supply pump 39*a*2. The second supply pump 39*a*2 is disposed at a position in the −X direction of the first supply pump 39*a*1 illustrated in FIG. 1, and is not illustrated in FIG. 1. The second supply pump 39*a*2 corresponds to an example of a second pressurization mechanism.

Figure 2:
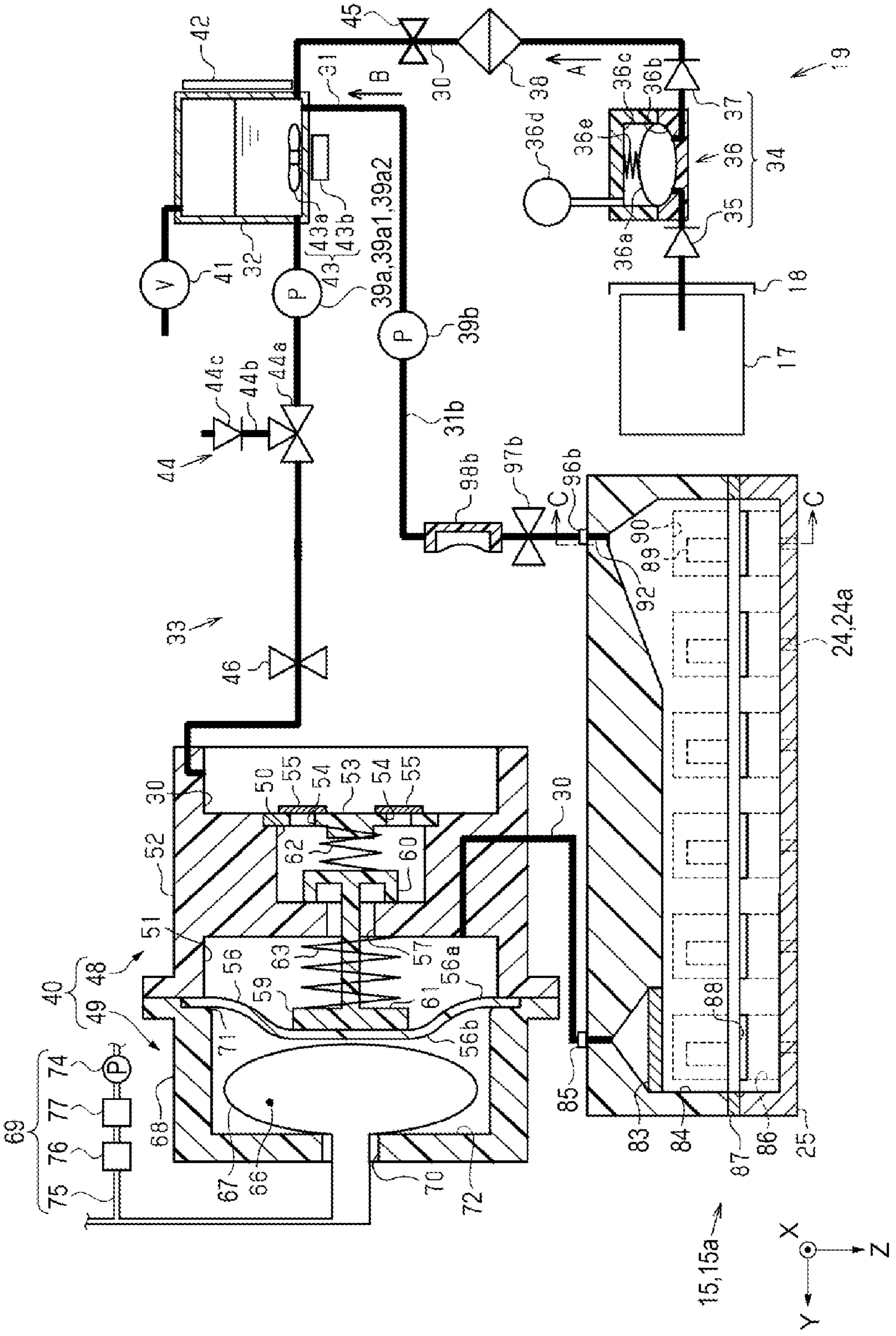
FIG. 2 is a diagram illustrating a configuration of a liquid supply mechanism.

FIG. 2 illustrates a configuration of a liquid supply mechanism. The liquid supply mechanism is a mechanism for supplying the ink or processing liquid to the printing head 15. The liquid supply mechanism illustrated in FIG. 2 includes the liquid supply source 17, the mounting portion 18, the liquid supply unit 19, and the printing head 15. The printer 11 includes a plurality of the liquid supply mechanisms. The liquid supply mechanism including the first printing head 15*a* supplies the first ink to the first printing head 15*a*. The liquid supply mechanism including the second printing head 15*b* supplies the processing liquid to the second printing head 15*b*. The liquid supply mechanism including the third printing head 15*c* supplies the second ink to the third printing head 15*c*. The plurality of liquid supply mechanisms have the same configuration. FIG. 2 illustrates the liquid supply mechanism including the first printing head 15*a*.

The lead-out pump 34 illustrated in FIG. 2 includes a suctioning valve 35, a volume pump 36, and an ejecting valve 37. The suctioning valve 35 is located upstream the volume pump 36 in the supply direction A in the liquid supply flow path 30. The ejecting valve 37 is located downstream the volume pump 36 in the supply direction A in the liquid supply flow path 30. The suctioning valve 35 and the ejecting valve 37 permit a flow of the first ink from upstream to downstream the liquid supply flow path 30, and prevents a flow of the first ink from downstream to upstream. The volume pump 36 includes a flexible member 36*a*, a pump chamber 36*b*, a negative pressure chamber 36*c*, a decompression unit 36*d*, and a pressing member 36*e*. The flexible member 36*a* separates the pump chamber 36*b* from the negative pressure chamber 36*c*. The decompression unit 36*d* decompresses the negative pressure chamber 36*c*. The pressing member 36*e* is provided in the negative pressure chamber 36*c*, and presses the flexible member 36*a* toward the pump chamber 36*b*.

The lead-out pump 34 suctions the first ink from the liquid supply source 17 via the suctioning valve 35, when volume of the pump chamber 36*b* increases. The lead-out pump 34 pressurizes the first ink by the pressing member 36*e* pushing the first ink in the pump chamber 36*b* via the flexible member 36*a*. When the volume of the pump chamber 36*b* decreases, the lead-out pump 34 ejects the first ink toward the first printing head 15*a* via the ejecting valve 37. Pressing force of the lead-out pump 34 to pressurize the first ink is set to a positive pressure higher than an atmospheric pressure, for example, to +50 kPa as a gauge pressure, by pressing force of the pressing member 36*e*.

The liquid storage unit 32 includes a storage open valve 41, a storage amount detector 42, and a stirring mechanism 43. The storage open valve 41 opens the space in the liquid storage unit 32 to the air. The storage amount detector 42 detects an amount of the first ink stored in the liquid storage unit 32. The stirring mechanism 43 stirs the first ink in the liquid storage unit 32. The stirring mechanism 43 includes a stirring bar 43*a*, and a rotating unit 43*b*. The stirring bar 43*a* is provided in the liquid storage unit 32 and stirs the first ink. The rotating unit 43*b* rotates the stirring bar 43*a*.

The liquid supply unit 19 includes an air inlet unit 44 downstream the liquid storage unit 32. The air inlet unit 44 takes air into the liquid supply flow path 30. The air inlet unit 44 includes a switching valve 44*a*, an air inflow path 44*b*, and a one-way valve 44*c*. The switching valve 44*a* is provided in the liquid supply flow path 30. The air inflow path 44*b* is coupled to the switching valve 44*a*. The one-way valve 44*c* is provided in the air inflow path 44*b*. The switching valve 44*a* is a three-way valve that switches communication with non-communication between the liquid supply flow path 30 and the air inflow path 44*b*. The one-way valve 44*c* permits an airflow toward the liquid supply flow path 30, and prevents a fluid flow outward from the liquid supply flow path 30. By the liquid supply flow path 30 communicating with the air inflow path 44*b*, air is taken in the liquid supply flow path 30 via the air inflow path 44*b*.

The supply pump 39*a* illustrated in FIG. 1 is disposed between the liquid storage unit 32 and the air inlet unit 44. When the liquid supply mechanism illustrated in FIG. 2 supplies the first ink to the first printing head 15*a*, the supply pump 39*a* corresponds to the first supply pump 39*a*1. When the liquid supply mechanism illustrated in FIG. 2 supplies the processing liquid to the second printing head 15*b*, the supply pump 39*a* corresponds to the second supply pump 39*a*2.

The liquid supply unit 19 includes a choke valve 46 downstream the air inlet unit 44. The choke valve 46 operates, when suction cleaning is performed by the suction mechanism 134 described below. The choke valve 46 is closed, when choke suctioning for decompressing a closed space including the first printing head 15*a* and accumulating a negative pressure is performed.

The pressure regulating mechanism 40 includes a pressure regulating unit 48, and a pressing mechanism 49. The pressure regulating unit 48 constitutes a part of the liquid supply flow path 30. The pressing mechanism 49 regulates a pressure within the pressure regulating unit 48. The pressure regulating unit 48 includes a main body 52. The main body 52 forms a liquid inflow chamber 50 and a liquid outflow chamber 51. The first ink supplied from the liquid supply source 17 via the liquid supply flow path 30 flows into the liquid inflow chamber 50. The liquid outflow chamber 51 accommodates the first ink.

The liquid supply flow path 30 and the liquid inflow chamber 50 are partitioned by a wall 53 included in the main body 52. The liquid supply flow path 30 and the liquid inflow chamber 50 communicate with each other via a through-hole 54 formed in the wall 53. The through-hole 54 is covered by a filter member 55. The first ink flowing into the liquid inflow chamber 50 from the liquid supply flow path 30 is filtered by the filter member 55.

The liquid outflow chamber 51 includes a diaphragm 56. The diaphragm 56 constitutes a first surface 56*a*, which is an inner surface of the liquid outflow chamber 51. The diaphragm 56 receives a pressure of the first ink in the liquid outflow chamber 51 at the first surface 56*a*. The diaphragm 56 receives the atmospheric pressure at a second surface 56*b*, which is a surface opposite to the first surface 56*a*. The diaphragm 56 is displaced in accordance with the pressure of the first ink in the liquid outflow chamber 51. Volume of the liquid outflow chamber 51 changes due to the displacement of the diaphragm 56. The liquid inflow chamber 50 and the liquid outflow chamber 51 communicate with each other by a communication flow path 57.

The pressure regulating unit 48 includes a supply valve 59. The supply valve 59 may take a closed-valve state for preventing a flow of the first ink in the communication flow path 57, and an open-valve state for permitting the flow of the first ink in the communication flow path 57. The supply valve 59 opens when a pressure in the first printing head 15*a* is equal to or less than a predetermined pressure. The supply valve 59 is provided between the liquid storage unit 32 in the liquid supply flow path 30 and the first printing head 15*a*. The supply valve 59 illustrated in FIG. 2 is in the closed-valve state. The supply valve 59 includes a valve portion 60, and a pressure receiving portion 61. The valve portion 60 blocks the communication flow path 57. The pressure receiving portion 61 receives a pressure from the diaphragm 56. The supply valve 59 moves by the pressure receiving portion 61 being pushed by the diaphragm 56.

A first pressing member 62 is provided in the liquid inflow chamber 50. A second pressing member 63 is provided in the liquid outflow chamber 51. The first pressing member 62 and the second pressing member 63 press the supply valve 59 in a direction in which the supply valve 59 is caused to be closed. When a first pressure applied to the first surface 56*a* is lower than a second pressure applied to the second surface 56*b*, and a difference between the first pressure and the second pressure is equal to or greater than a predetermined set value, the supply valve 59 transits to the open-valve state from the closed-valve state. The predetermined set value is, for example, set in a range from 1 kPa to 2 kPa.

Pressing force of the first pressing member 62 and the second pressing member 63 is set in a range where the first ink in the first nozzle 24*a* is in a negative pressure state. The first ink in the first nozzle 24*a* forms a concave meniscus as a gas-liquid interface. The gas-liquid interface is a boundary where liquid and gas contact. The meniscus is a curved liquid surface formed by the first ink in contact with the first nozzle 24*a*. For example, assume that the pressure applied to the second surface 56*b* is the atmospheric pressure, and a height difference between the common flow path and the liquid outflow chamber 51 is 50 mm. The pressing force of the first pressing member 62 and the second pressing member 63 is set in a range where the pressure of the first ink in the liquid outflow chamber 51 is from −1 kPa to −2 kPa as a gauge pressure. The concave meniscus suitable for spraying the first ink may be formed at the first nozzle 24*a*.

When the supply valve 59 of the pressure regulating unit 48 is in the closed-valve state, a pressure of the first ink inside the liquid inflow chamber 50 and upstream the liquid inflow chamber 50 is set to a positive pressure that is higher than the atmospheric pressure, for example, to +50 kPa as a gauge pressure, by the supply pump 39*a*. When the supply valve 59 of the pressure regulating unit 48 is in the closed-valve state, a pressure of the first ink inside the liquid outflow chamber 51 and downstream the liquid outflow chamber 51 is set to a negative pressure that is lower than the atmospheric pressure.

When the first printing head 15*a* ejects the first ink, the first ink accommodated in the liquid outflow chamber 51 is supplied to the first printing head 15*a* via the liquid supply flow path 30. The ink pressure in the liquid outflow chamber 51 decreases. When the difference between the pressure applied to the first surface 56*a* of the diaphragm 56 and the pressure applied to the second surface 56*b* is equal to or greater than the set value, the diaphragm 56 bends and deforms in a direction in which the volume of the liquid outflow chamber 51 is reduced.

The pressure receiving portion 61 is pushed, due to the deformation of the diaphragm 56. By the pressure receiving portion 61 being pushed, the supply valve 59 is brought into the open-valve state for permitting a flow of the first ink from the liquid inflow chamber 50 toward the liquid outflow chamber 51.

When the supply valve 59 is in the open-valve state, the first ink in the liquid inflow chamber 50 is supplied from the liquid inflow chamber 50 to the liquid outflow chamber 51 by pressurization of the first supply pump 39*a*1. The diaphragm 56 is deformed by the supplied first ink, and increases the volume of the liquid outflow chamber 51. When the difference between the pressure applied to the first surface 56*a* of the diaphragm 56 and the pressure applied to the second surface 56*b* is equal to or less than the set value, the supply valve 59 transits to the closed-valve state from the open-valve state. The supply valve 59 prevents a flow of the first ink flowing from the liquid inflow chamber 50 toward the liquid outflow chamber 51. The pressure regulating unit 48 regulates the pressure of the first ink in the first printing head 15*a*, by regulating the pressure of the first ink supplied to the first printing head 15*a* with the displacement of the diaphragm 56.

The pressing mechanism 49 includes an expansion contraction portion 67, a holding member 68, and a pressure regulating unit 69. The expansion contraction portion 67 forms a pressure regulating chamber 66 on the second surface 56*b* side of the diaphragm 56. The expansion contraction portion 67 is formed of rubber, resin, or the like, in a balloon shape. The holding member 68 holds down the expansion contraction portion 67. The pressure regulating unit 69 regulates a pressure in the pressure regulating chamber 66. The expansion contraction portion 67 expands or contracts in accordance with the pressure regulation of the pressure regulating chamber 66 by the pressure regulating unit 69.

The holding member 68 is a cylindrical member having a bottom, and formed with an opening 71. An insertion hole 70 is formed in the bottom of the holding member 68. A part of expansion contraction portion 67 is inserted into the insertion hole 70. The holding member 68 is mounted to the pressure regulating unit 48, and the opening 71 is closed by the pressure regulating unit 48. The holding member 68 forms an air chamber 72 covering the second surface 56*b* of the diaphragm 56. The air chamber 72 communicates with an external space via a gap between the insertion hole 70 and the expansion contraction portion 67. The atmospheric pressure acts on the second surface 56*b* of the diaphragm 56.

The pressure regulating unit 69 regulates the pressure inside the pressure regulating chamber 66 to be a pressure higher than the atmospheric pressure, which is a pressure of the air chamber 72, to expand the expansion contraction portion 67. In the pressing mechanism 49, the pressure regulating unit 69 expands the expansion contraction portion 67, to push the diaphragm 56 in a direction in which the volume of the liquid outflow chamber 51 decreases. By the expansion contraction portion 67 of the pressing mechanism 49 pushing the pressure receiving portion 61 via the diaphragm 56, the supply valve 59 of the pressure regulating unit 48 is forcibly brought into the open-valve state. The pressing mechanism 49 functions as an open valve mechanism capable of opening the supply valve 59.

The pressure regulating unit 69 includes a pressure pump 74, a coupling flow path 75, a pressure detector 76, and a fluid regulating unit 77. The pressure pump 74 pressurizes fluid such as air, water, or the like. The coupling flow path 75 couples the pressure pump 74 to the expansion contraction portion 67. The pressure detector 76 detects a pressure of fluid in the coupling flow path 75. The fluid regulating unit 77 regulates the pressure of the fluid in the coupling flow path 75.

The coupling flow path 75 branches into a plurality of flow paths, and the flow paths are coupled to the respective expansion contraction portions 67 of a plurality of the provided pressure regulating mechanisms 40. The fluid pressurized by the pressure pump 74 is supplied to each expansion contraction portion 67 via the coupling flow path 75.

The fluid regulating unit 77 is constituted by a control valve that is controlled to open or close based on a pressure detected by the pressure detector 76, or a relief valve that automatically opens when the pressure of the fluid in the coupling flow path 75 is higher than a predetermined pressure. When the fluid regulating unit 77 is open, the fluid in the coupling flow path 75 is released outward. By releasing the fluid outward, the fluid regulating unit 77 decompresses the fluid in the coupling flow path 75.

The first printing head 15*a* illustrated in FIG. 2 includes the supplying port 85 that causes the first ink to flow in. The supplying port 85 is coupled to the liquid supply flow path 30 capable of supplying the first ink to the first printing head 15*a*. The first printing head 15*a* includes a common liquid chamber 84 as the common flow path communicating with the supplying port 85. A height difference between the common liquid chamber 84 and the nozzle surface 25 is a difference that need not be considered at the time of pressure conversion. The first printing head 15*a* includes a filter 83 that filters the supplied first ink. The first printing head 15*a* ejects the first ink filtered by the filter 83 from the first nozzle 24*a*. The filter 83 captures air bubbles, foreign materials, and the like, in the supplied first ink. The filter 83 is provided in the common liquid chamber 84 communicated with the liquid supply flow path 30.

The first printing head 15*a* includes a plurality of individual liquid chambers 86 communicating with the common liquid chamber 84. One first nozzle 24*a* is provided corresponding to one individual liquid chamber 86. A part of a wall surface of the individual liquid chamber 86 is configured with a vibrating plate 87. The common liquid chamber 84 and the plurality of individual liquid chambers 86 communicate with each other via a supply side communicating path 88. Each of the plurality of first nozzles 24*a* communicates with the common liquid chamber 84 via the corresponding individual liquid chamber 86. Each of the plurality of first nozzles 24*a* opens to the nozzle surface 25.

The first printing head 15*a* includes a plurality of the ejecting elements 89 and a plurality of accommodating chambers 90. Each of the plurality of accommodating chambers 90 contains one ejecting element 89. The accommodating chamber 90 is disposed at a position different from that of the common liquid chamber 84. The ejecting element 89 is provided at a surface opposite to a part, of the vibrating plate 87, facing the individual liquid chamber 86. The first printing head 15*a* drives the ejecting element 89 to eject the first ink in the individual liquid chamber 86 as droplets from the plurality of first nozzles 24*a*.

The ejecting element 89 includes a piezoelectric element that contracts by being applied with a drive voltage. The ejecting element 89 contracts to deform the vibrating plate 87. In a state where the vibrating plate 87 is deformed, when the application of the drive voltage to the ejecting element 89 is released, the first ink in the individual liquid chamber 86 with volume changed is sprayed as a droplet from the first nozzle 24*a*.

Figure 3:
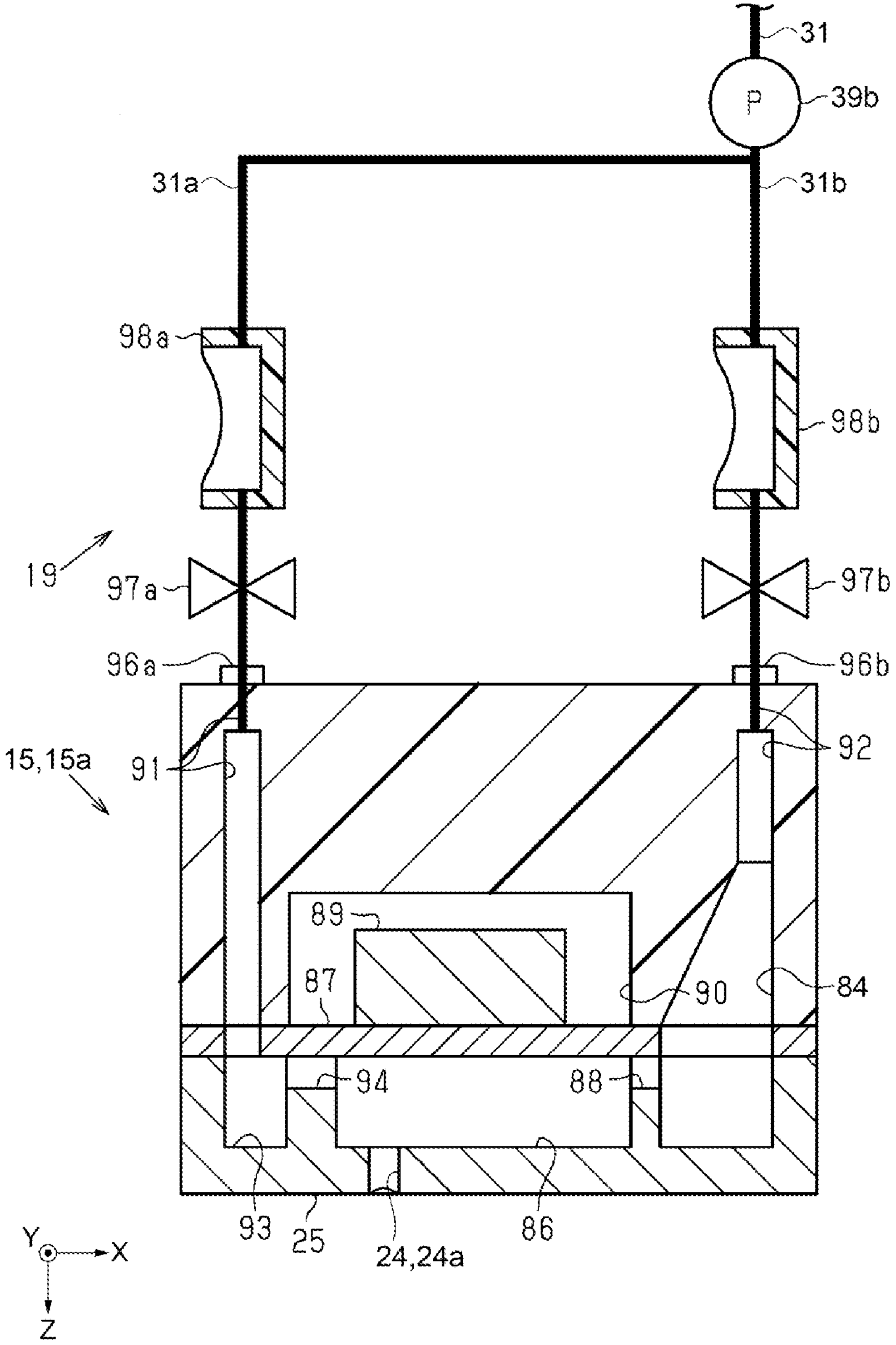
FIG. 3 is a cross-sectional view taken along a C-C line illustrated in FIG. 2.

FIG. 3 illustrates a cross-sectional view taken along the line C-C illustrated in FIG. 2. The first printing head 15*a* includes a first discharge port 96*a* and a second discharge port 96*b*. The first discharge port 96*a* and the second discharge port 96*b* emit the supplied first ink outward not via the first nozzle 24*a*. The first printing head 15*a* includes a first emission flow path 91, a second emission flow path 92, and an emission liquid chamber 93. The first emission flow path 91 communicates with the first discharge port 96*a*. The second emission flow path 92 communicates with the second discharge port 96*b*. The emission liquid chamber 93 couples the first emission flow path 91 and the individual liquid chamber 86. The emission liquid chamber 93 communicates with the first discharge port 96*a* via the first emission flow path 91, and communicates with the supplying port 85 via the individual liquid chamber 86 and the common liquid chamber 84. The common liquid chamber 84 communicates with the first discharge port 96*a* via the individual liquid chamber 86, the emission liquid chamber 93, and the first emission flow path 91, and communicates with the second discharge port 96*b* via the second emission flow path 92.

The emission liquid chamber 93 is coupled to the plurality of individual liquid chambers 86 via an emission side communicating path 94 provided for each individual liquid chamber 86. Since the emission liquid chamber 93 is provided, the first emission flow path 91 need not be provided for each individual liquid chamber 86. The first printing head 15*a* may include a plurality of the first emission flow path 91 that communicate with of the plurality of individual liquid chambers 86, respectively.

The liquid return flow path 31 includes a first return flow path 31*a*, and a second return flow path 31*b*. The first return flow path 31*a* returns the first ink supplied to the first printing head 15*a* to the liquid supply flow path 30. The second return flow path 31*b* is coupled to the first return flow path 31*a* coupled to the first discharge port 96*a*, and to the second discharge port 96*b*. In the liquid return flow path 31, the first return flow path 31*a* joins to the second return flow path 31*b*. Each of the first return flow path 31*a* and the second return flow path 31*b* may be coupled to the liquid storage unit 32.

A first return valve 97*a* and a first damper 98*a* are provided in the first return flow path 31*a*. A second return valve 97*b* and a second damper 98*b* are provided in the second return flow path 31*b*. The return pump 39*b* may be provided in each of the first return flow path 31*a* and the second return flow path 31*b*.

In the first return flow path 31*a*, the first damper 98*a* is provided at a position closer to the return pump 39*b* than the first return valve 97*a*. In the second return flow path 31*b*, the second damper 98*b* is provided at a position closer to the return pump 39*b* than the second return valve 97*b*. The first damper 98*a* and the second damper 98*b* each store the first ink. As an example, a part of each of the first damper 98*a* and the second damper 98*b* is formed by a flexible film. The first damper 98*a* and the second damper 98*b* are configured such that volume for storing the first ink is variable. By providing the first damper 98*a* and the second damper 98*b*, a fluctuation in pressure generated in the first printing head 15*a* when the first ink flows through the first return flow path 31*a* and the second return flow path 31*b* can be suppressed.

The first ink in the first return flow path 31*a* and the second return flow path 31*b* flows, by opening or closing the first return valve 97*a* and the second return valve 97*b*. By opening the first return valve 97*a* and driving the return pump 39*b*, the first ink in the common liquid chamber 84 of the first printing head 15*a* is emitted from the first discharge port 96*a* to the first return flow path 31*a*. By opening the second return valve 97*b* and driving the return pump 39*b*, the first ink in the common liquid chamber 84 of the first printing head 15*a* is emitted from the second discharge port 96*b* to the second return flow path 31*b*.

When the first ink in the common liquid chamber 84 is emitted to the liquid return flow path 31, a pressure of the first ink in the common liquid chamber 84 decreases. The first ink accommodated in the liquid outflow chamber 51 of the pressure regulating unit 48 is supplied to the common liquid chamber 84 via the liquid supply flow path 30. A pressure in the liquid outflow chamber 51 decreases. When the difference between the pressure applied on the first surface 56*a* of the diaphragm 56 and the pressure applied to the second surface 56*b* is equal to or greater than the set value, the supply valve 59 is brought into the open-valve state for permitting a flow of the first ink flowing from the liquid inflow chamber 50 toward the liquid outflow chamber 51. The first ink supplied from the liquid supply flow path 30 to the first printing head 15*a* via the liquid inflow chamber 50 is returned to the liquid supply flow path 30 via the liquid return flow path 31, and the liquid storage unit 32.

The first return valve 97*a* and the second return valve 97*b* are closed together with the choke valve 46, when choke suction is performed by the suction mechanism 134. The first return valve 97*a* and the second return valve 97*b* close a space in the liquid supply flow path 30 from the choke valve 46 to the first printing head 15*a*, a space in the liquid return flow path 31 from the first printing head 15*a* to the first return valve 97*a* and the second return valve 97*b*, and a space in the first printing head 15*a*.

Figure 4:
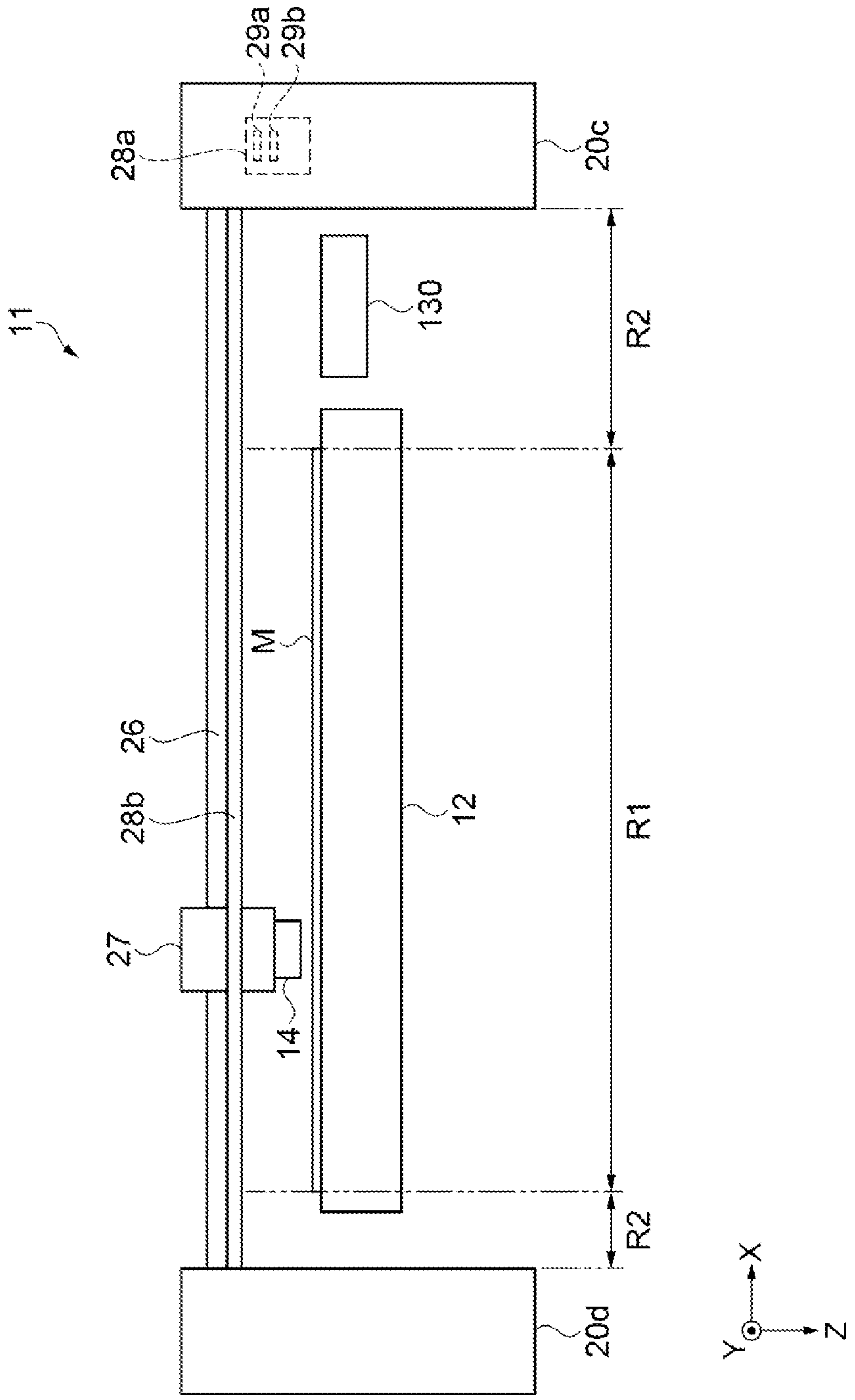
FIG. 4 is a diagram illustrating a schematic configuration of the printer as viewed from a +Y direction.

FIG. 4 illustrates a schematic configuration of the printer 11 as viewed from the +Y direction. FIG. 4 illustrates the support 12, the head unit 14, the carriage 27, the carriage motor 28*a*, a transporting belt 28*b*, a position sensor 29*a*, a torque sensor 29*b*, a first side plate 20*c*, a second side plate 20*d*, and a maintenance unit 130.

The first side plate 20*c* and the second side plate 20*d* support the two guide shafts 26. FIG. 4 illustrates one guide shaft 26. The first side plate 20*c* is disposed at an end portion position in the +X direction of the printer 11. The second side plate 20*d* is disposed at an end portion position in the −X direction of the printer 11. The first side plate 20*c* and the second side plate 20*d* may be each configured as a part of the main body 20, or may be configured separately. Each of the first side plate 20*c* and the second side plate 20*d* may include a transporting belt support member (not illustrated) that supports the transporting belt 28*b*.

The guide shaft 26 is supported by the first side plate 20*c* and the second side plate 20*d*. The two guide shafts 26 are disposed along the X-axis. The guide shaft 26 supports the carriage 27, and guides the carriage 27 along the X-axis. The printer 11 includes the two guide shafts 26 as illustrated in FIG. 1 and FIG. 4, but may also include one guide shaft 26, or may include three or more guide shafts 26.

The transporting belt 28*b* moves the carriage 27 along the guide shaft 26. The transporting belt 28*b* illustrated in FIG. 4 moves the carriage 27 in the +X direction, and the −X direction. The transporting belt 28*b* moves the carriage 27 by driving force of the carriage motor 28*a*. The transporting belt 28*b* moves the head unit 14 via the carriage 27. The transporting belt 28*b* is coupled to the carriage motor 28*a* via the drive transmission mechanism such as a gear or a pulley (not illustrated).

The carriage motor 28*a* generates the driving force for moving the carriage 27. The driving force is torque as mechanical output of the carriage motor 28*a*. The carriage motor 28*a* includes, for example, a field system of a permanent magnet type or stator, and a rotor that rotates in the field system. A rotary shaft (not illustrated) to be coupled to the drive transmission mechanism is linked to the rotor. The carriage motor 28*a* is coupled to the transporting belt 28*b* via the drive transmission mechanism. The carriage motor 28*a* may transmit drive force directly to the transporting belt 28*b*. The carriage motor 28*a* illustrated in FIG. 4 is disposed at an end portion position in the +X direction. The carriage motor 28*a* corresponds to an example of a movement unit.

The position sensor 29*a* detects a position of the carriage 27, or of the head unit 14 placed on the carriage 27. The position sensor 29*a* illustrated in FIG. 4 is built in the carriage motor 28*a*. The carriage motor 28*a* includes a rotary encoder as the position sensor 29*a*. The rotary encoder detects a rotational position of a rotary shaft core of the carriage motor 28*a*. The rotary encoder detects the rotational position to detect a relative position of the carriage 27 or the like to the rotational position. The position sensor 29*a* is not limited to the rotary encoder. The position sensor 29*a* may be configured separately from the carriage motor 28*a*. The position sensor 29*a* may be constituted by a line sensor or the like for detecting a position of the carriage 27. The position sensor 29*a* corresponds to an example of a position detecting unit.

The torque sensor 29*b* detects load torque applied to the carriage motor 28*a*. The torque sensor 29*b* illustrated in FIG. 4 is built in the carriage motor 28*a*. The torque sensor 29*b* detects a jam of the printing medium M by detecting the load torque. By the printing medium M in contact with the head unit 14 or the carriage 27, the jam of the printing medium M occurs. By the printing medium M in contact with the head unit 14 or the carriage 27, a movement load of the carriage 27 increases. The torque sensor 29*b* detects the jam by detecting the increasing movement load. A jam detecting unit is not limited to the torque sensor 29*b*. The jam detecting unit may be an end portion position sensor that detects an end portion position of the printing medium M. The jam detecting unit may be a sensor that detects a transport load of the transporting unit 13. The torque sensor 29*b* corresponds to an example of a jam detector.

The maintenance unit 130 maintains the head unit 14. The maintenance unit 130 is disposed at an end portion in a movement direction of the carriage 27, and at a position facing the head unit 14. The maintenance unit 130 illustrated in FIG. 4 is disposed at an end portion position in the +X direction. A detailed configuration of the maintenance unit 130 will be described later with reference to FIG. 5.

FIG. 4 illustrates a printing region R1 and a non-printing region R2. The printing region R1 and the non-printing region R2 are regions parallel to the X-axis. The carriage 27 is movable in the printing region R1 and the non-printing region R2. The carriage 27 moves in the printing region R1 and the non-printing region R2 by driving force of the carriage motor 28*a*.

The printing region R1 is a region where printing is performed on the printing medium M by the head unit 14. The printing region R1 is a region between the end portion in the +X direction of the printing medium M and the end portion in the −X direction. In the printing region R1, the printing head 15 in the head unit 14 faces the printing medium M. The printing region R1 is a region in which the printing medium M is transported. When a jam occurs during printing, at least a part of the head unit 14 stops in the printing region R1.

The non-printing region R2 is a region in the +X direction or the −X direction of the printing region R1. In the non-printing region R2, the printing head 15 in the head unit 14 and the printing medium M do not face each other. The non-printing region R2 includes a region where the head unit 14 and the maintenance unit 130 face each other. In the non-printing region R2, the head unit 14 does not print on the printing medium M.

Figure 5:
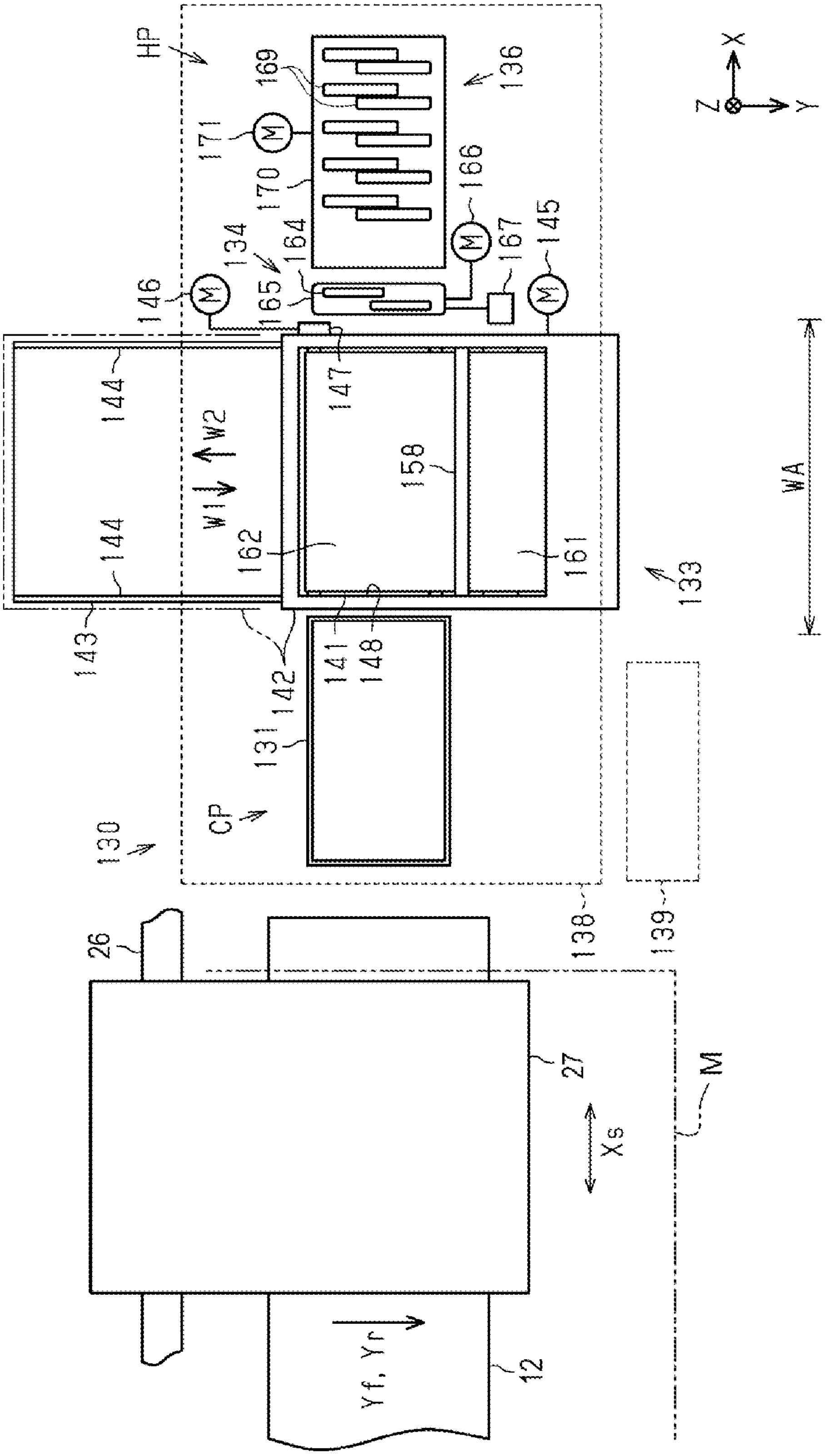
FIG. 5 is a diagram illustrating a configuration of a maintenance unit.

FIG. 5 illustrates a configuration of the maintenance unit 130. FIG. 5 is a diagram of a periphery of the maintenance unit 130 as viewed from the −Z direction. FIG. 5 illustrates the carriage 27 at a position in the −X direction of the maintenance unit 130.

As illustrated in FIG. 5, the printer 11 includes the maintenance unit 130 for maintaining the head unit 14. The maintenance unit 130 is provided in the non-printing region R2 as illustrated in FIG. 4. The maintenance unit 130 includes a liquid receiving portion 131, a wiping mechanism 133, a suction mechanism 134, a capping mechanism 136, a waste pan 138, and a waste reservoir 139. The maintenance unit 130 corresponds to an example of a maintaining unit.

A position in the −Z direction of the capping mechanism 136 is a home position HP of the head unit 14. The home position HP is a starting point of movement of the head unit 14. A region in the −Z direction of the wiping mechanism 133 is a wiping region WA.

A position in the −Z direction of the liquid receiving portion 131 is an emission position CP of the head unit 14. When the head unit 14 is located at the emission position CP, the nozzle surface 25 faces the liquid receiving portion 131. A width along the X-axis and a length along the Y-axis of the liquid receiving portion 131 are greater than a width along the X-axis and a length along the Y-axis of the nozzle surface 25, respectively.

When positioning the head unit 14 at the emission position CP, the printer 11 drives the supply pump 39*a*. The printer 11 performs a pressurization emission operation that pressurizes the ink and processing liquid in the liquid supply unit 19 and causes the ink and processing liquid to be emitted from the nozzle 24. The liquid receiving portion 131 receives the ink and processing liquid emitted by the pressurization emission operation.

The liquid receiving portion 131 receives the ink and processing liquid that are emitted from the nozzle 24 of the printing head 15 by flushing. The flushing is performed for the purpose of preventing and eliminating clogging of the nozzle 24. The flushing is an operation of forcibly emitting the ink or processing liquid from the nozzle 24 regardless of printing, by driving the ejecting element 89 of the printing head 15.

The wiping mechanism 133 includes a band-shaped member 141, a holding portion 142, a base portion 143, and a pair of rails 144. The band-shaped member 141 absorbs the ink and processing liquid. A width along the X-axis of the band-shaped member 141 may be greater than the width along the X-axis of the nozzle surface 25. The holding portion 142 holds the band-shaped member 141. The base portion 143 holds the holding portion 142 so as to be movable in a first wiping direction W1 and a second wiping direction W2 opposite to the first wiping direction W1. The first wiping direction W1 and the second wiping direction W2 are directions along the Y-axis. The pair of rails 144 are disposed along the Y-axis. The wiping mechanism 133 may include a wiping motor 145, a winding motor 146, and a power transmission mechanism 147 that transmits power of the winding motor 146. An opening region 148 that exposes the band-shaped member 141 is formed in the holding portion 142.

The holding portion 142 reciprocates along the Y-axis on the pair of rails 144 by power of the wiping motor 145. The holding portion 142 moves between a standby position indicated by a two-dot chain line in FIG. 5 and an accommodation position indicated by a solid line in FIG. 5. When the wiping motor 145 is driven forward, the holding portion 142 moves from the standby position to the accommodation position along the first wiping direction W1. When the wiping motor 145 is driven backward, the holding portion 142 moves from the accommodation position to the standby position along the second wiping direction W2.

The wiping mechanism 133 performs a wiping operation for wiping the nozzle surface 25 of the printing head 15 located in the wiping region WA, when the holding portion 142 moves in the first wiping direction W1, or when the holding portion 142 moves in the second wiping direction W2. The wiping mechanism 133 may perform the wiping operation, when the holding portion 142 moves in the first wiping direction W1, and when the holding portion 142 moves in the second wiping direction W2. The wiping operation is a maintenance operation for wiping the nozzle surface 25 by the band-shaped member 141. The wiping mechanism 133 corresponds to an example of a cleaning unit.

The wiping mechanism 133 may be provided with a pressing portion (not illustrated) around which the band-shaped member 141 is wound, and a restricting member 158. The pressing portion presses the band-shaped member 141 toward the −Z direction, and protrudes the band-shaped member 141 from the opening region 148. Of the band-shaped member 141, a part that is pressed by the pressing portion serves as a wiping portion 161 that wipes the nozzle surface 25. When the holding portion 142 moves in the first wiping direction W1 or the second wiping direction W2, the pressing portion causes the band-shaped member 141 to contact the nozzle surface 25 so as to capable of wiping the nozzle surface 25. The restricting member 158 restricts a position in the −Z direction of the band-shaped member 141. By the restricting member 158 restricting the position in the −Z direction of the band-shaped member 141, the band-shaped member 141 can contact the nozzle surface 25 at the wiping portion 161 illustrated in FIG. 5.

The wiping mechanism 133 includes a lead-out portion 162. With the lead-out portion 162, the band-shaped member 141 is lead out to a position facing the nozzle surface 25 in a non-contact manner. The accommodation position of the holding portion 142 indicated by the solid line in FIG. 5 is a position where the liquid receiving portion 131 and the lead-out portion 162 are aligned along the X-axis. When the holding portion 142 is at the accommodation position, the printer 11 may cause the printing head 15 to face the lead-out portion 162 to perform the pressurization emission operation, or to perform flushing.

The suction mechanism 134 includes a suction cap 164, a suction holding body 165, a suction motor 166, and a decompression mechanism 167. The suction motor 166 reciprocates the suction holding body 165 along the Z-axis. The suction motor 166 moves the suction cap 164 between a contact position and a retracted position by reciprocating the suction holding body 165. The contact position is a position where the suction cap 164 contacts the printing head 15 and surrounds the nozzle 24. The retracted position is a position where the suction cap 164 is separated from the printing head 15. The suction cap 164 may be configured to surround all of the nozzles 24 of the printing head 15 together, or may be configured to surround some of the nozzles 24. The decompression mechanism 167 decompresses inside the suction cap 164.

The printer 11 moves the printing head 15 to a position in the −Z direction of the suction mechanism 134. In the suction mechanism 134, one nozzle row is surrounded by the suction cap 164, when the suction cap 164 is located at the contact position. The suction mechanism 134 may perform suction cleaning for decompressing inside the suction cap 164 by the decompression mechanism 167 to cause the ink or processing liquid to be emitted from the nozzle 24. The suction mechanism 134 may accommodate the ink or processing liquid that is emitted by the suction cleaning. The suction mechanism 134 corresponds to an example of a cleaning unit.

The capping mechanism 136 includes a standby cap 169, a standby holding body 170, and a standby motor 171. The standby motor 171 reciprocates the standby holding body 170 along the Z-axis. By driving of the standby motor 171, the standby holding body 170 and the standby cap 169 move in the +Z direction or the −Z direction. The standby cap 169 moves from a separation position, which is a position in the +Z direction, to a capping position, which is a position in the −Z direction. The standby cap 169 at the capping position contacts the printing head 15 that is stopped at the home position HP.

The standby cap 169 surrounds an opening of the nozzle 24. Maintenance in which the standby cap 169 surrounds the opening of the nozzle 24 is referred to as standby capping. The standby capping is a type of capping. The standby capping suppresses drying of the nozzle 24. The standby cap 169 may be configured to surround all of the nozzles 24 together, or may be configured to surround some of the nozzles 24.

Figure 6:
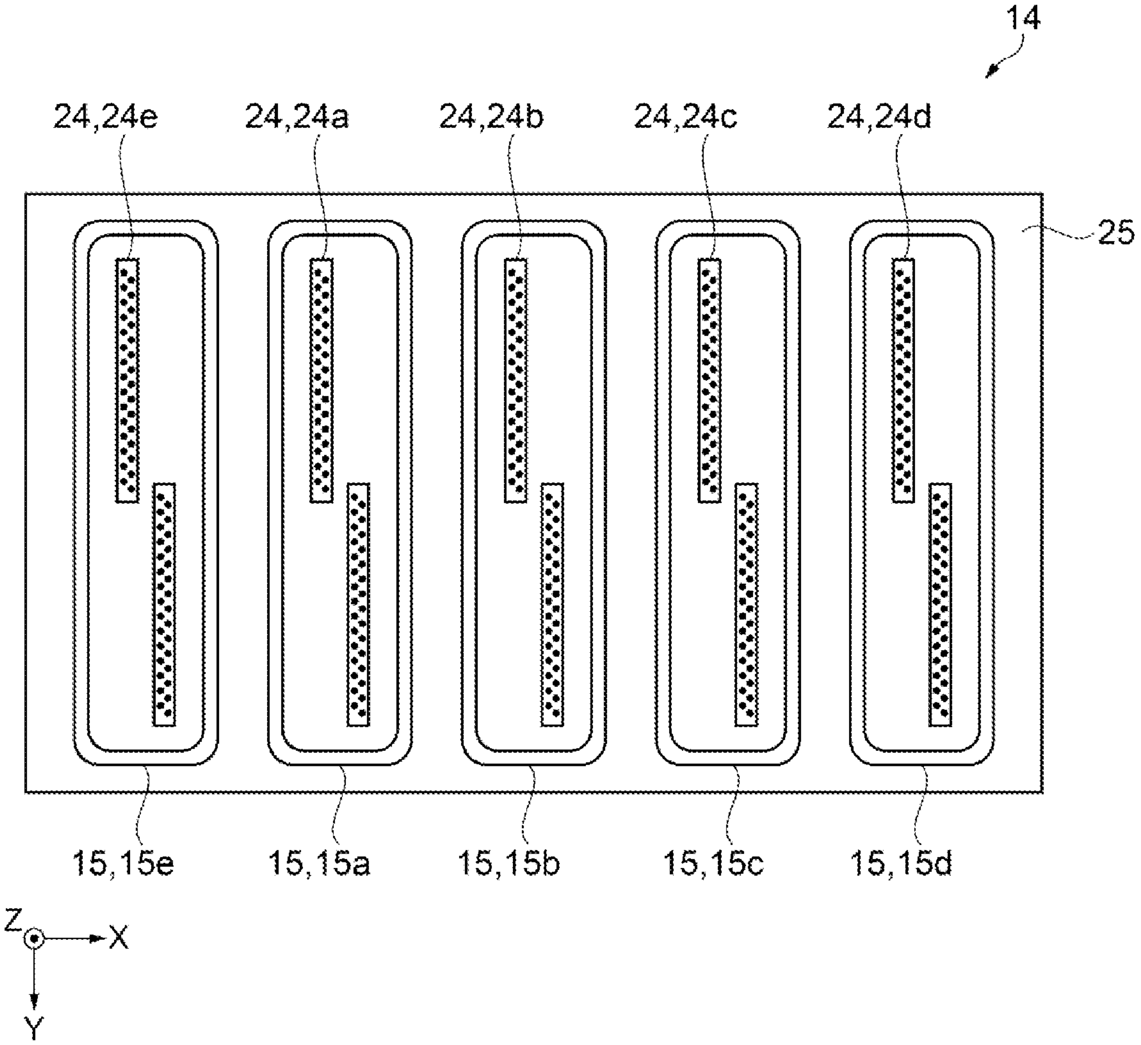
FIG. 6 is a diagram illustrating a schematic configuration of a head unit.

FIG. 6 illustrates a schematic configuration of the head unit 14. FIG. 6 is a diagram of the nozzle surface 25 when viewed from the +Z direction. The head unit 14 includes the plurality of printing heads 15. The head unit 14 illustrated in FIG. 6 includes the five printing heads 15. In the head unit 14, a fifth printing head 15*e*, the first printing head 15*a*, the second printing head 15*b*, the third printing head 15*c*, and a fourth printing head 15*d* are arrayed in order in the +X direction along the X-axis. The disposition of the plurality of printing heads 15 is not limited to the configuration in FIG. 6. The disposition of the plurality of printing heads 15 can be changed as appropriate.

The first printing head 15*a* includes the plurality of first nozzles 24*a* at the nozzle surface 25. The plurality of first nozzles 24*a* form a plurality of nozzle rows along the Y-axis. The plurality of nozzle rows are disposed along the X-axis. Each of the plurality of first nozzles 24*a* ejects the first ink containing a color material of a first color. For example, each of the plurality of first nozzles 24*a* ejects a black ink as the first ink.

The second printing head 15*b* includes a plurality of the second nozzles 24*b* at the nozzle surface 25. The plurality of second nozzles 24*b* form a plurality of nozzle rows along the Y-axis. The plurality of nozzle rows are disposed along the X-axis. Each of the plurality of second nozzles 24*b* ejects the processing liquid.

The third printing head 15*c* includes a plurality of the third nozzles 24*c* at the nozzle surface 25. The plurality of third nozzles 24*c* form a plurality of nozzle rows along the Y-axis. The plurality of nozzle rows are disposed along the X-axis. Each of the plurality of third nozzles 24*c* ejects the second ink having a color material of a second color different from the first color. For example, each of the plurality of third nozzles 24*c* ejects a cyan ink as the second ink.

The fourth printing head 15*d* includes a plurality of fourth nozzles 24*d* at the nozzle surface 25. The plurality of fourth nozzles 24*d* form a plurality of nozzle rows along the Y-axis. The plurality of nozzle rows are disposed along the X-axis. Each of the plurality of fourth nozzles 24*d* ejects a third ink containing a color material of a third color different from the first color and the second color. For example, each of the plurality of fourth nozzles 24*d* ejects a magenta ink as the third ink. The third ink corresponds to an example of liquid.

The fifth printing head 15*e* includes a plurality of fifth nozzles 24*e* at the nozzle surface 25. The plurality of fifth nozzles 24*e* form a plurality of nozzle rows along the Y-axis. The plurality of nozzle rows are disposed along the X-axis. Each of the plurality of fifth nozzles 24*e* ejects a fourth ink containing a color material of a fourth color different from the first color, the second color, and the third color. For example, each of the plurality of fifth nozzles 24*e* ejects a yellow ink as the fourth ink. The fourth ink corresponds to an example of the liquid.

Figure 7:
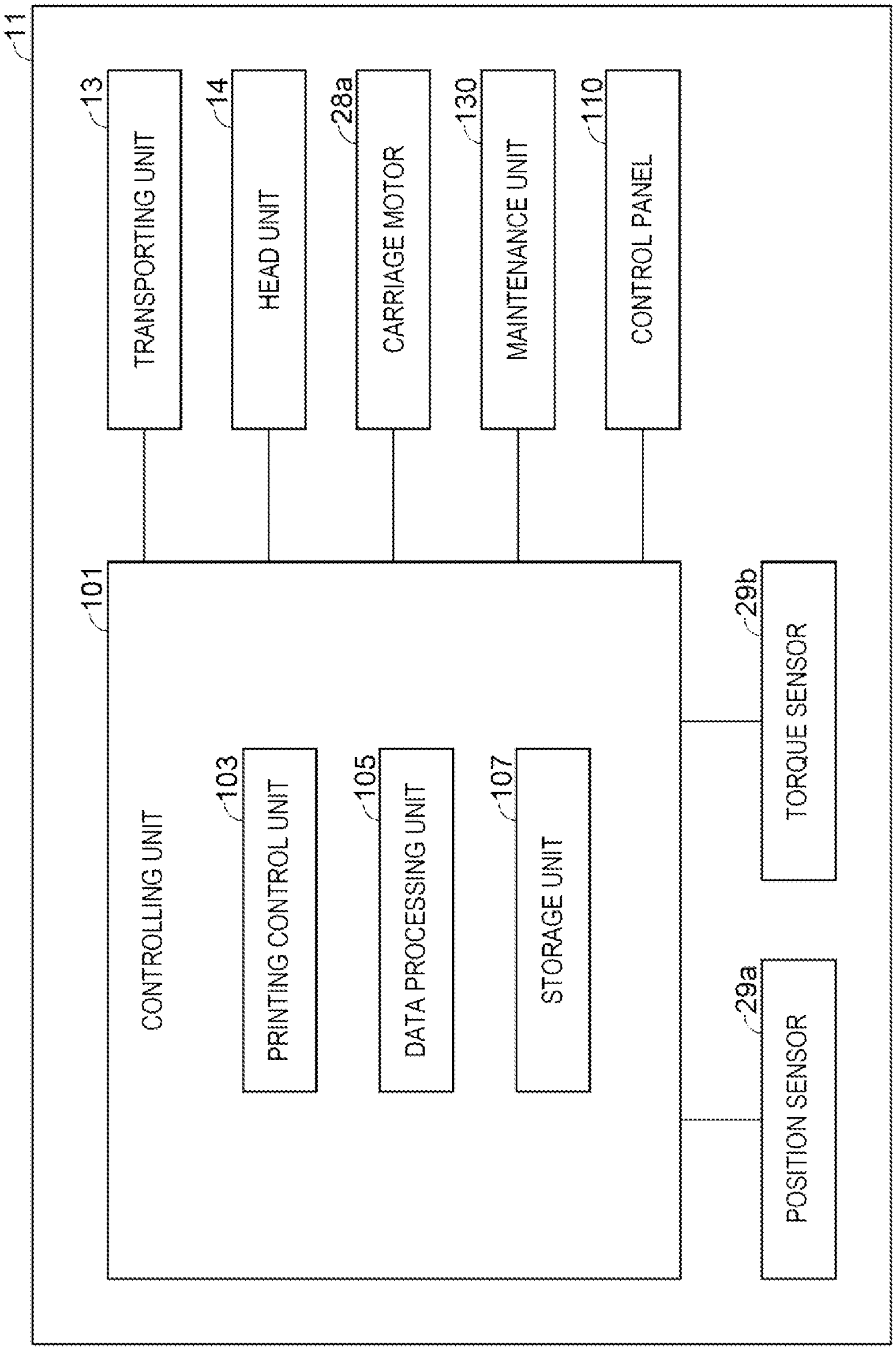
FIG. 7 is a diagram illustrating a block configuration of the printer.

FIG. 7 illustrates a block configuration of the printer 11. The printer 11 includes the transporting unit 13, the head unit 14, the carriage motor 28*a*, a control panel 110, the maintenance unit 130, the position sensor 29*a*, the torque sensor 29*b*, and a controlling unit 101.

The controlling unit 101 is a controller that controls each unit of the printer 11. The controlling unit 101 includes a control processor such as a CPU (Central Processing Unit), a RAM (Random Access Memory), a ROM (Read Only Memory), and the like. The controlling unit 101 operates as a function unit by executing a program in a control processor. The RAM, and the ROM function as a work area. The controlling unit 101 corresponds to an example of a control unit. The controlling unit 101 controls each unit, and the like, based on detection results detected by various sensors such as the position sensor 29*a* and the torque sensor 29*b*.

The controlling unit 101 includes a storage unit 107. The storage unit 107 stores various programs, such as a control program running in the controlling unit 101, and the like, and various types of data. The storage unit 107 stores various types of data such as print data. The RAM, and ROM may operate as the storage unit 107, or a magnetic storage device such as an HDD (Hard Disk Drive), a semiconductor memory, and the like may be provided.

The controlling unit 101 functions as a printing control unit 103 and a data processing unit 105 by executing the control program. The printing control unit 103 and the data processing unit 105 are functional units. The controlling unit 101 controls the transporting unit 13, the head unit 14, the carriage motor 28*a*, and the maintenance unit 130, by functioning as the printing control unit 103 and the data processing unit 105.

The printing control unit 103 controls the transporting unit 13, the head unit 14, the carriage motor 28*a*, and the maintenance unit 130. The printing control unit 103 controls the plurality of printing heads 15 in the head unit 14. The printing control unit 103 controls ejection of the ink or processing liquid from the nozzle 24 by controlling the plurality of printing heads 15. The printing control unit 103 controls transport of the printing medium M by controlling the transporting unit 13. The printing control unit 103 controls printing on the printing medium M.

When a jam occurs in the printing medium M, the printing control unit 103 controls the transporting unit 13, the head unit 14, the carriage motor 28*a*, and the maintenance unit

130. When the jam occurs in the printing medium M, the printing control unit 103 controls ejection of the ink and processing liquid onto the printing medium M, transport of the printing medium M, and transport of the carriage 27 by the carriage motor 28*a*. The printing control unit 103 controls operation of the maintenance unit 130, when the jam occurs in the printing medium M. When the jam occurs in the printing medium M, the printing control unit 103 controls ejection of the ink and processing liquid by the printing head 15, based on a data processing result by the data processing unit 105. The control by the printing control unit 103 when the jam occurs in the printing medium M will be described later.

The data processing unit 105 performs data processing based on the print data. The print data is received from an external device, via a communication interface (not illustrated). The print data may be stored in advance in the storage unit 107. The data processing unit 105 calculates a printing rate for each predetermined range based on the print data. The printing rate is a ratio of a region onto which the ink and processing liquid are ejected to an area of the printing medium M to be printed. As an example, the data processing unit 105 calculates a printing rate of an image printed on the printing medium M per scan. One scan is a scan in which the head unit 14 is moved from one side to another side of the guide shaft 26 by the carriage 27. The data processing unit 105 may calculate a printing rate for each printing head 15. The data processing unit 105 may calculate a printing rate of an image printed on the printing medium M per predetermined number of times of scans set in advance. The data processing unit 105 may calculate an ejection amount of each of the ink and processing liquid ejected from each printing head 15 per predetermined number of times of scans. The printing rate and the ejection amount per predetermined number of times calculated by the data processing unit 105 are stored in the storage unit 107. The calculated printing rate and the ejection amount are used for control at the time of jam occurrence.

The control panel 110 accepts various operations from a user. Printing setting, an instruction from the user, and the like are input into the control panel 110, by the various operations. Examples of the printing setting include type information of the printing medium M, a size of the printing medium M, printing resolution, color/monochrome setting, and the like. Examples of the instruction from the user include a print start instruction, a printing stop instruction, and a maintenance instruction of the printing head 15. Jam processing completion information indicating that jam processing by the user is completed is input into the control panel 110.

First Embodiment

Figure 8:
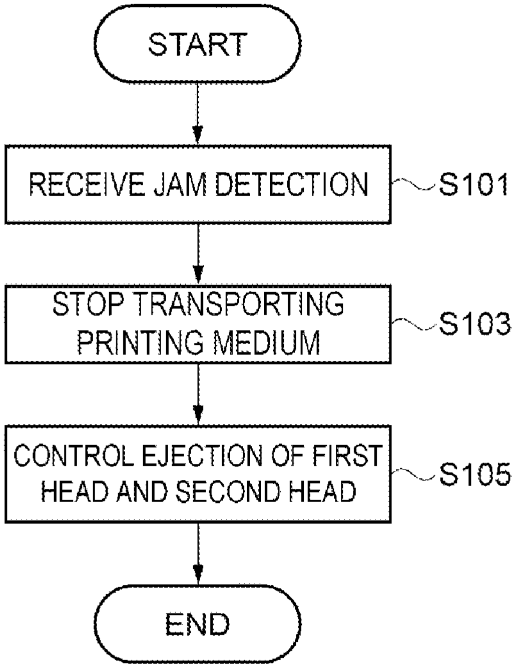
FIG. 8 is a diagram illustrating a control flow when a jam occurs.

FIG. 8 illustrates a control flow at the time of jam occurrence. FIG. 8 illustrates a basic flow controlled by the controlling unit 101 when a jam occurs in the printing medium M. When the jam occurs in the printing medium M, the controlling unit 101 controls the transporting unit 13, the head unit 14, the carriage motor 28*a*, and the maintenance unit 130. The first embodiment illustrates control by the controlling unit 101 when a jam illustrated in FIG. 9 occurs.

Figure 9:
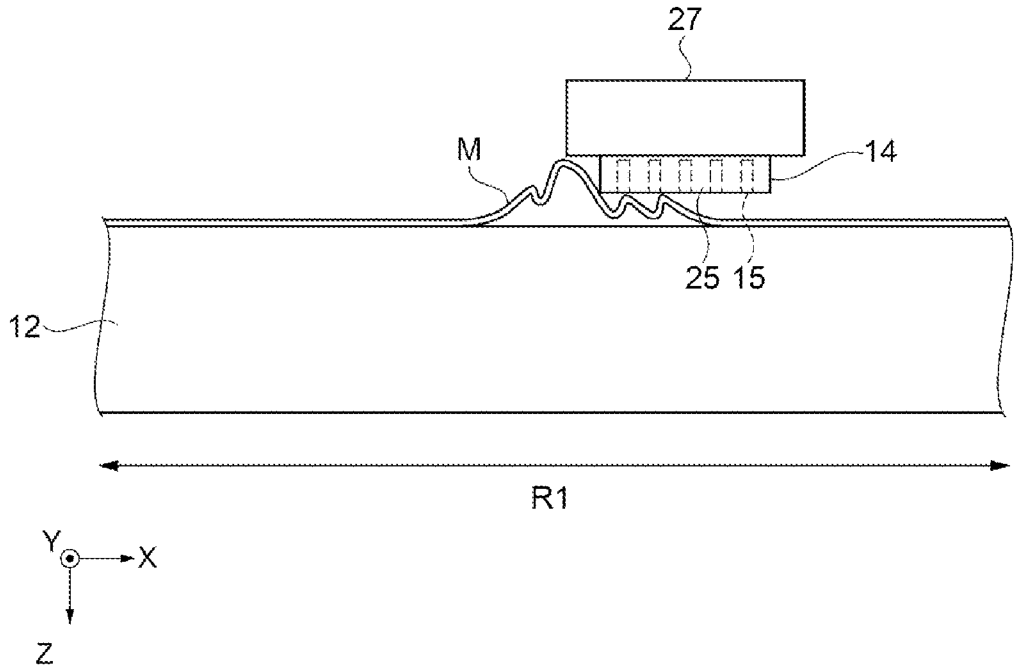
FIG. 9 is a diagram illustrating a state when a jam occurs.

FIG. 9 illustrates a state at the time of jam occurrence. FIG. 9 illustrates the support 12, the printing medium M, the carriage 27, and the head unit 14. The head unit 14 includes a plurality of the printing heads 15. In FIG. 9, a member such as the guide shaft 26 is omitted. FIG. 9 illustrates a state when the jam occurs in the printing region R1. The printing medium M is at a position facing the nozzle surface 25. As illustrated in FIG. 9, the jam occurs when the printing medium M contacts the carriage 27 or the head unit 14. When the head unit 14 ejects ink and processing liquid onto the printing medium M, the carriage 27 transports the head unit 14 in the −X direction or the +X direction. For example, when the printing medium M is floating above the support 12, the carriage 27 or the head unit 14 contacts the printing medium M. When the carriage 27 or the head unit 14 contacts the printing medium M, the printing medium M deforms, and the jam occurs.

As illustrated in FIG. 8, the printer 11 detects the jam of the printing medium M. When the jam illustrated in FIG. 9 occurs, load torque of the carriage motor 28*a* increases. The torque sensor 29*b* detects the load torque applied to the carriage motor 28*a*. When the load torque exceeds a predetermined threshold value, the torque sensor 29*b* detects the jam of the printing medium M. When detecting the jam, the torque sensor 29*b* transmits a jam occurrence signal to the controlling unit 101. The jam occurrence signal indicates the jam detection. The controlling unit 101 receives the jam occurrence signal in step S101. The controlling unit 101 receives the jam detection by receiving the jam occurrence signal.

When receiving the jam occurrence signal, the controlling unit 101 controls the transporting unit 13 in step S103, to stop transport of the printing medium M. The printing control unit 103 transmits a transport stop signal to the transporting unit 13 based on the received jam occurrence signal. The transporting unit 13 receives the transport stop signal, and stops the transport of the printing medium M. When receiving the jam occurrence signal, the printing control unit 103 controls the carriage motor 28*a*. The printing control unit 103 transmits a motor stop signal to the carriage motor 28*a*, based on the received jam occurrence signal. The carriage motor 28*a* receives the motor stop signal, and stops rotation. The carriage 27 stops transport of the carriage 27 according to the stopping of the carriage motor 28*a*. When the carriage 27 is stopped, the head unit 14 stops at a position where the nozzle surface 25 faces the printing medium M.

When stopping the transport of the printing medium M, the controlling unit 101 performs ejection control of the first printing head 15*a* and the second printing head 15*b* in step S105. The controlling unit 101 controls the first printing head 15*a* to eject the first ink from the first nozzle 24*a*. The first printing head 15*a* ejects the first ink onto the printing medium M. Alternatively, the controlling unit 101 controls the second printing head 15*b* to eject the processing liquid from the second nozzle 24*b*. The second printing head 15*b* ejects the processing liquid onto the printing medium M. The controlling unit 101 may control the first printing head 15*a* and the second printing head 15*b*. The controlling unit 101 causes the first printing head 15*a* to eject the first ink, and causes the second printing head 15*b* to eject the processing liquid. The first printing head 15*a* ejects the first ink onto the printing medium M, and the second printing head 15*b* ejects the processing liquid onto the printing medium M. When stopping the transport of the printing medium M, the controlling unit 101 may control the third printing head 15*c*, the fourth printing head 15*d*, and the fifth printing head 15*e*. The controlling unit 101 controls whether to eject the second ink from the third printing head 15*c* or not. The controlling unit 101 controls whether to eject the third ink from the fourth printing head 15*d* or not. The controlling unit 101 controls whether to eject the fourth ink from the fifth printing head 15*e* or not. The controlling unit 101 may cause the third printing head 15*c* to eject the second ink, cause the fourth print head 15*d* to eject the third ink, and cause the fifth print head 15*e* to eject the fourth ink. The third printing head 15*c* ejects the second ink onto the printing medium M, the fourth printing head 15*d* ejects the third ink onto the printing medium M, and the fifth printing head 15*e* ejects the fourth ink onto the printing medium M. Processing in which one or more printing heads 15 eject the ink or processing liquid onto the printing medium M based on the jam occurrence signal will be referred to as stop position ejection processing below.

The controlling unit 101 performs control when transport of the printing medium M is caused to stop by a function of the printing control unit 103. When receiving the jam occurrence signal, the printing control unit 103 controls operation of the head unit 14. When receiving the jam occurrence signal, the printing control unit 103 transmits a stop position ejection signal to the head unit 14. The stop position ejection signal includes information specifying the printing head 15 for ejecting the ink or processing liquid. The head unit 14 receives the stop position ejection signal. Based on the received stop position ejection signal, the first nozzle 24*a* of the first printing head 15*a* ejects the first ink. Alternatively, the second nozzle 24*b* of the second printing head 15*b* ejects the processing liquid. The first nozzle 24*a* of the first printing head 15*a* may eject the first ink, and the second nozzle 24*b* of the second printing head 15*b* may eject the processing liquid. Based on the received stop position ejection signal, the third nozzle 24*c* of the third printing head 15*c* may eject the second ink, the fourth nozzle 24*d* of the fourth printing head 15*d* may eject the third ink, and the fifth nozzle 24*e* of the fifth printing head 15*e* may eject the fourth ink. The head unit 14 performs the stop position ejection processing for ejecting the ink or processing liquid from the printing head 15 specified in the stop position ejection signal.

When the jam illustrated in FIG. 9 occurs, there is a possibility that the printing medium M contacts the nozzle surface 25. When the printing medium M contacts the nozzle surface 25, the ink and processing liquid may contact each other on the nozzle surface 25 or in the nozzle 24. When the ink and processing liquid contact each other, the processing liquid coagulates a component in the ink. A coagulate is generated in the nozzle 24 or on the nozzle surface 25, resulting in clogging the nozzle 24. An ejection failure of the ink or processing liquid occurs due to the clogging of the nozzle 24, and image quality deteriorates. When the jam occurs, the printing head 15 ejects the ink or processing liquid, thereby reducing a retention amount of the ink or processing liquid in the nozzle. The printing head 15 ejects the ink or processing liquid, and thus the printer 11 reduces a possibility that an ejection failure of the ink or processing liquid occurs.

When causing the transport of the printing medium M to stop, the controlling unit 101 may control the supply pump 39*a* and the return pump 39*b*. When causing the transport of the printing medium M to stop, the controlling unit 101 stops the supply pump 39*a*. When the jam occurs, the controlling unit 101 stops supply of the ink or processing liquid to the nozzle 24. When causing the transport of the printing medium M to stop, the controlling unit 101 stops the return pump 39*b*. The controlling unit 101 suppresses occurrence of clogging in the liquid return flow path 31, by stopping a flow of the ink or processing liquid in the liquid return flow path 31 after the jam occurrence.

The printer 11 that ejects the ink onto the printing medium M in the printing region R1 to perform printing includes the first printing head 15*a* that ejects the first ink that is the ink onto the printing medium M, the head unit 14 including the second printing head 15*b* that ejects the processing liquid containing the coagulant for coagulating a component in the ink, the transporting unit 13 causing the printing medium M to be transported, the torque sensor 29*b* that detects a jam of the printing medium M, and the controlling unit 101 that controls the head unit 14 and the transporting unit 13. When the jam is detected by the torque sensor 29*b*, the controlling unit 101 stops the printing medium M transported by the transporting unit 13, and causes the ink, the processing liquid, or the ink and the processing liquid to be ejected from the first printing head 15*a* and the second printing head 15*b* in the printing region R1.

The printer 11 can reduce coagulation caused by a reaction of the ink and processing liquid in the first printing head 15*a*, or the second printing head 15*b*. The printer 11 can reduce the clogging of the nozzle 24 due to the reaction of the ink and processing liquid. In addition, since the ink or processing liquid is ejected onto the printing medium M, a possibility that the ink or processing liquid ejected attaches to a member such as the support 12 is reduced.

Further, the head unit 14 includes the third printing head 15*c* that ejects the second ink different from the first ink. The controlling unit 101 controls whether to eject the second ink from the third printing head 15*c* when the jam is detected by the torque sensor 29*b* or not.

When provided with the third printing head 15*c*, the printer 11 can control ejection of the second ink from the third printing head 15*c* at the time of jam occurrence.

The printer 11 may include the first supply pump 39*a*1 that pressurizes a first ink in the first printing head 15*a*, and the second supply pump 39*a*2 that pressurizes the processing liquid in the second printing head 15*b*. The controlling unit 101 causes the first supply pump 39*a*1 to drive to eject the first ink, and causes the second supply pump 39*a*2 to drive to eject the processing liquid.

The printer 11 can eliminate a negative pressure in each of the first printing head 15*a* and the second printing head 15*b* after ejection, by ejecting the ink and processing liquid by pressurization. The printer 11 can suppress clogging of the nozzle 24 due to coagulation by a reaction between the first ink and processing liquid in each of the first printing head 15*a* and the second printing head 15*b*.

The printer 11 includes the liquid supply flow path 30 for supplying the first ink to the first printing head 15*a*, the liquid return flow path 31 for returning the first ink from the first printing head 15*a*, and the return pump 39*b* that causes the first ink in the liquid return flow path 31 to flow. The controlling unit 101 controls the return pump 39*b* to stop the return pump 39*b* when the jam is detected in torque sensor 29*b*.

The printer 11 suppresses occurrence of clogging in the flow path by coagulation due to a reaction of the first ink and processing liquid in the flow path through which the first ink or processing liquid flows, by stopping the return pump 39*b*.

In a liquid ejecting method for the printer 11 for ejecting ink onto the printing medium M, a first ink that is ink is ejected from the first printing head 15*a*, a processing liquid containing a coagulant for coagulating a component of the first ink is ejected from the second printing head 15*b* onto the printing medium M, and when a jam of the printing medium M is detected, transport of the printing medium M is stopped, and the first ink, the processing liquid, or the first ink and the processing liquid is ejected in the printing region R1.

The printer 11 reduces coagulation caused by a reaction of the first ink and processing liquid in the first printing head 15*a*, or the second printing head 15*b*. The printer 11 reduces clogging of the nozzle 24 due to the reaction of the first ink and processing liquid. Also, since the first ink or processing liquid is ejected onto the printing medium M, the printer 11 reduces a possibility of the ejected first ink or processing liquid attaches to a member such as the support 12.

The controlling unit 101 may adjust an ejection amount of the ink or processing liquid ejected from the printing head 15 at the time of jam occurrence. The printing control unit 103 adjusts the ejection amount of the ink or processing liquid, based on a printing rate calculated by the data processing unit 105. When the jam occurrence is detected, the printing control unit 103 acquires a printing rate stored in the storage unit 107. The printing rate to be acquired may be a printing rate of an image printed in a scan at the time of jam occurrence. The printing rate to be acquired may be a printing rate of an image printed in a predetermined number of times of scans before the jam occurrence. The printing rate to be acquired is a printing rate in a predetermined calculation range.

The printing control unit 103 adjusts an ejection amount of the ink or processing liquid to be ejected, based on the acquired printing rate. The printing control unit 103 reduces the ejection amount of the ink or processing liquid to be ejected, based on the acquired printing rate. When the acquired printing rate is less than a predetermined printing rate threshold value, the printing control unit 103 reduces the ejection amount of the ink or processing liquid to be ejected to be less than the predetermined ejection amount. When the printing rate is low, the ejection amount of the ink or processing liquid ejected onto the printing medium M before the jam occurrence is small. Since clogging is unlikely to occur in the nozzle 24, the controlling unit 101 reduces the ejection amount of the ink or processing liquid. When the acquired printing rate is less than the predetermined printing rate threshold value, the printing control unit 103 may increase the ejection amount of the ink or processing liquid to be ejected to be greater than the predetermined ejection amount. When the printing rate is low, an amount of the ink or processing liquid that the printing medium M can absorb increases, and thus the controlling unit 101 may increase the ejection amount of the ink or processing liquid to be ejected to be greater than the predetermined ejection amount.

The controlling unit 101 calculates a printing rate when printing is performed, and adjusts an ejection amount of the ink or processing liquid to be ejected when the torque sensor 29*b* detects a jam, based on the printing rate.

The printer 11 changes the ejection amount of the ink or processing liquid in accordance with the printing rate, and thus can suppress consumption of the ink or processing liquid, or occurrence of clogging in the nozzle 24.

The first embodiment illustrates the case where the printer 11 is used in which the carriage 27 is caused to scan the head unit 14, but is not limited thereto. The first embodiment can be applied when a line head is used as the head unit 14. The line head is fixedly disposed at a position facing the printing medium M. The torque sensor 29*b* is disposed at the transport roller pair 21 in the transporting unit 13 that transports the printing medium M. When a jam occurs, transport torque of the transport roller pair 21 increases. The torque sensor 29*b* disposed at the transport roller pair 21 detects occurrence of the jam when a predetermined threshold is exceeded. The torque sensor 29*b* transmits a jam occurrence signal to the controlling unit 101, and the controlling unit 101 controls the printing head 15 based on the jam occurrence signal to perform the stop position ejection processing.

Second Embodiment

Figure 10:
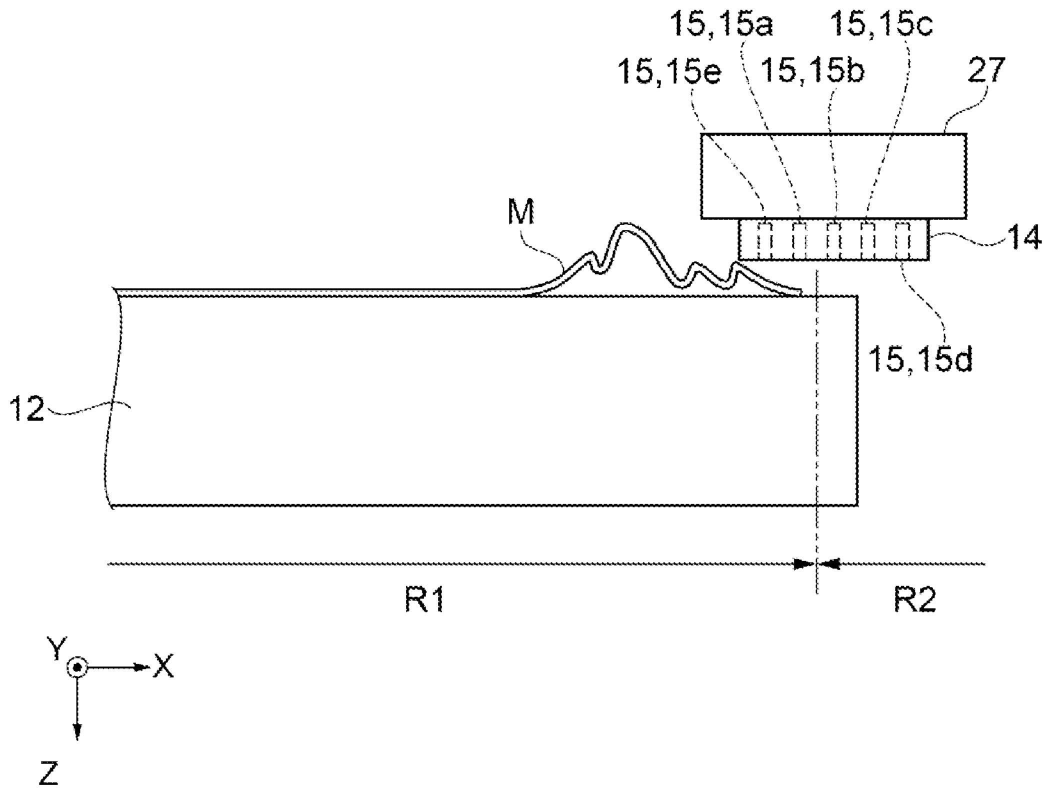
FIG. 10 is a diagram illustrating a state when a jam occurs.

A second embodiment illustrates a control flow by the controlling unit 101 assuming a case illustrated in FIG. 10 where a jam of the printing medium M occurs. FIG. 10 illustrates a state at the time of jam occurrence. FIG. 10 illustrates a case where the jam occurs in a boundary region between the printing region R1 and the non-printing region R2. FIG. 10 illustrates a state of the jam occurring when the carriage 27 moves the head unit 14 in the −X direction. The head unit 14 is stopped at a position where the head unit 14 straddles the printing region R1 and the non-printing region R2. The first printing head 15*a* and the fifth printing head 15*e* are located in the printing region R1, when the head unit 14 is stopped at the stop position. The second printing head 15*b*, the third printing head 15*c*, and the fourth printing head 15*d* are located in the non-printing region R2, when the head unit 14 is stopped at the stop position. The jam of the printing medium M illustrated in FIG. 10 may occur when an end portion in the +X direction, or the −X direction of the printing medium M is floating.

Figure 11:
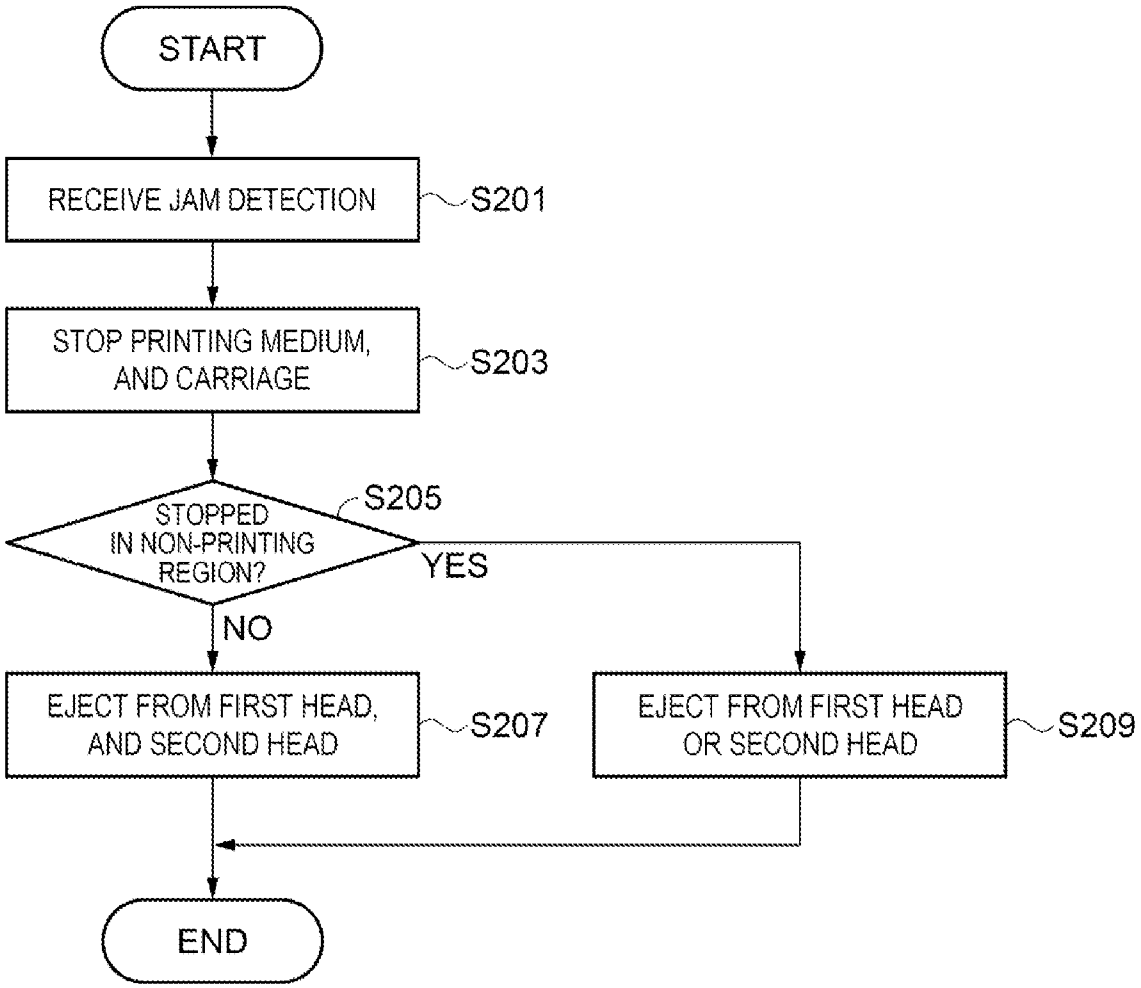
FIG. 11 is a diagram illustrating a control flow when a jam occurs.

FIG. 11 illustrates a control flow at the time of jam occurrence. FIG. 11 illustrates the control flow assuming that the jam illustrated in FIG. 10 occurs. FIG. 11 illustrates the control flow by the controlling unit 101 of the second embodiment. FIG. 11 illustrates the control flow based on respective stop positions of the first printing head 15*a* and the second printing head 15*b*. In the control flow illustrated in FIG. 11, the third printing head 15*c* and the fourth printing head 15*d* disposed at the positions illustrated in FIG. 6 perform processing under the same control as that for the second printing head 15*b*. The fifth printing head 15*e* disposed at the position illustrated in FIG. 6 performs processing under the same control as that for the first printing head 15*a*.

The printer 11 detects the jam of the printing medium M. When the jam illustrated in FIG. 9 or FIG. 10 occurs, load torque of the carriage motor 28*a* increases. The torque sensor 29*b* detects the load torque applied to the carriage motor 28*a*. When the load torque exceeds a predetermined threshold value, the torque sensor 29*b* detects the jam of the printing medium M. When detecting the jam, the torque sensor 29*b* transmits a jam occurrence signal to the controlling unit 101. The controlling unit 101 receives the jam occurrence signal in step S201. The controlling unit 101 receives the jam detection by receiving the jam occurrence signal.

When receiving the jam occurrence signal, the controlling unit 101 stops the printing medium M and the carriage 27 in step S203. When receiving the jam occurrence signal, the controlling unit 101 controls the transporting unit 13 to stop transport of the printing medium M. The printing control unit 103 transmits a transport stop signal to the transporting unit 13 based on the received jam occurrence signal. The transporting unit 13 receives the transport stop signal, and stops the transport of the printing medium M. When receiving the jam occurrence signal, the printing control unit 103 controls the carriage motor 28*a*. The printing control unit 103 transmits a motor stop signal to the carriage motor 28*a*, based on the received jam occurrence signal. The carriage motor 28*a* receives the motor stop signal, and stops rotation. The carriage 27 stops transport of the head unit 14 according to the stopping the carriage motor 28*a*. When the carriage 27 is stopped, the head unit 14 is stopped.

When the printing medium M and the carriage 27 are stopped, the position sensor 29*a* detects a stop position of the carriage 27. The stop position of the carriage 27 indicates a stop position of the head unit 14. The position sensor 29*a* transmits the detected stopped position of the carriage 27 to the controlling unit 101. Based on the received stop position, the controlling unit 101 calculates the respective stop positions of the first printing head 15*a* and the second printing head 15*b* in the head unit 14. In step S205, the controlling unit 101 determines whether any of the first printing head 15*a* and the second printing head 15*b* is stopped in the non-printing region R2 or not.

When the head unit 14 is stopped at the position illustrated in FIG. 9, the first printing head 15*a* and the second printing head 15*b* are located in the printing region R1. The first printing head 15*a* and the second printing head 15*b* are not stopped in the non-printing region R2. The controlling unit 101 proceeds to step S207 (step S205; NO). When the head unit 14 is stopped at the position illustrated in FIG. 10, the first printing head 15*a* is located in the printing region R1. On the other hand, the second printing head 15*b* is located in the non-printing region R2. Since the second printing head 15*b* is stopped in the non-printing region R2, the controlling unit 101 proceeds to step S209 (step S205; YES).

The controlling unit 101 causes the first printing head 15*a* to eject the first ink, and causes the second printing head 15*b* to eject the processing liquid, in step S207. As illustrated in FIG. 9, when the carriage 27 is stopped, the first printing head 15*a* and the second printing head 15*b* are located above the printing medium M. The printing control unit 103 controls ejection by the first printing head 15*a* and the second printing head 15*b*. The first printing head 15*a* ejects the first ink onto the printing medium M, and the second printing head 15*b* ejects the processing liquid onto the printing medium M. Since the first printing head 15*a* and the second printing head 15*b* perform the stop position ejection processing above the printing medium M, a possibility of ejecting the first ink or processing liquid onto the support 12, or the like is low. As illustrated in FIG. 9, when the carriage 27 is stopped, the third printing head 15*c*, the fourth printing head 15*d*, and the fifth printing head 15*e* are located above the printing medium M. The third printing head 15*c* ejects the second ink onto the printing medium M, the fourth printing head 15*d* ejects the third ink onto the printing medium M, and the fifth printing head 15*e* ejects the fourth ink onto the printing medium M. After performing the stop position ejection processing, the printer 11 waits until a user releases the jam of the printing medium M. While waiting, the printer 11 does not cause the transporting unit 13 and the carriage motor 28*a* to operate.

On the other hand, in step S209, the controlling unit 101 causes either one of the first printing head 15*a* and the second printing head 15*b* to perform the stop position ejection processing. When the carriage 27 is stopped at the position illustrated in FIG. 10, the controlling unit 101 causes the first ink to be ejected from the first printing head 15*a*, and does not cause the processing liquid to be ejected from the second printing head 15*b*. The first printing head 15*a* is located in the printing region R1, and thus is likely to eject the first ink onto the printing medium M. The second printing head 15*b* is located in the non-printing region R2, and thus is likely to eject onto a member different from the printing medium M. The controlling unit 101 does not cause the processing liquid to be ejected from the second printing head 15*b*, thereby reducing a possibility of the second printing head 15*b* ejecting the processing liquid onto a member such as the support 12. When the carriage 27 is stopped at the position illustrated in FIG. 10, the controlling unit 101 causes the fifth printing head 15*e* to eject the fourth ink, and does not cause the third printing head 15*c* and the fourth printing head 15*d* to eject the ink. After the first printing head 15*a* performs the stop position ejection processing, the printer 11 waits until the user releases the jam of the printing medium M. While waiting, the printer 11 does not cause the transporting unit 13 and the carriage motor 28*a* to operate.

The controlling unit 101 controls ejection by the plurality of printing heads 15, depending on the position where the carriage 27 is stopped. When the plurality of printing heads 15 are disposed as illustrated in FIG. 6, as an example, the fifth printing head 15*e* may be stopped in the printing region R1, and the first printing head 15*a*, the second printing head 15*b*, the third printing head 15*c*, and the fourth printing head 15*d* may be stopped in the non-printing region R2. In this case, the controlling unit 101 causes the fifth printing head 15*e* to eject the fourth ink, and does not cause the first printing head 15*a*, the second printing head 15*b*, the third printing head 15*c*, and the fourth printing head 15*d* to perform the stop position ejection processing. Depending on a movement direction of the carriage 27, the fourth printing head 15*d* may be stopped in the printing region R1, and the first printing head 15*a*, the second printing head 15*b*, the third printing head 15*c*, and the fifth printing head 15*e* may be stopped in the non-printing region R2. In this case, the controlling unit 101 causes the fourth printing head 15*d* to eject the third ink, and does not cause the first printing head 15*a*, the second printing head 15*b*, the third printing head 15*c*, and the fifth printing head 15*e* to perform the stop position ejection processing. The controlling unit 101 controls the performance of the stop position ejection processing, based on the respective stop positions of the plurality of printing heads 15.

The disposition of the plurality of printing heads 15 is not limited to the disposition illustrated in FIG. 6. The second printing head 15*b* ejecting the processing liquid may be disposed at the position of the fifth printing head 15*e* illustrated in FIG. 6. The disposition of each printing head 15 can be changed as appropriate. The controlling unit 101 controls the stop position ejection processing of each printing head 15, in accordance with the stop position at which the carriage 27 is stopped.

The jams of the printing medium M illustrated in FIG. 9 and FIG. 10 occur, when the carriage 27 moves to the printing region R1, or when the carriage 27 moves in the printing region R1. When the jam of the printing medium M illustrated in FIG. 10 occurs, at least one printing head 15 among the plurality of printing heads 15 is stopped in the printing region R1. When the carriage 27 is stopped, the controlling unit 101 causes at least one printing head 15 among the plurality of printing heads 15 to perform the stop position ejection processing.

The printer 11 includes the carriage motor 28*a* that moves the head unit 14, and the position sensor 29*a* that detects a position of the head unit 14. When a jam is detected in the torque sensor 29*b*, the controlling unit 101 controls the carriage motor 28*a* to stop movement of the head unit 14, causes the position sensor 29*a* to detect a stop position of the head unit 14, causes one of the first ink and processing liquid to be ejected from the first printing head 15*a* and the second printing head 15*b*, based on the stop position of the head unit 14 detected by the position sensor 29*a*, and do not cause another of the first ink and processing liquid to be ejected.

The printer 11 performs control not to cause the first ink or processing liquid to be ejected, depending on the stop position of the head unit 14. A possibility of ejecting the first ink or processing liquid at a position other than that of the printing medium M is reduced. The printer 11 reduces a possibility of ejecting the ink or processing liquid onto a member such as the support 12.

The second embodiment has illustrated the case in which the ink is ejected and the processing liquid is not ejected, but is not limited thereto. Depending on disposition of a plurality of the printing heads 15, the processing liquid is ejected, and the ink is not ejected, in some cases. As an example, the second printing head 15*b* may be disposed at the position of the fifth printing head 15*e* of the head unit 14 illustrated in FIG. 6. In this disposition, when the jam illustrated in FIG. 10 occurs, the second printing head 15*b* is stopped in the printing region R1, and the other printing heads 15 ejecting the ink are stopped in the non-printing region R2. At this time, the second printing head 15*b* ejects the processing liquid, and the other printing heads 15 do not eject the ink.

After performing the stop position ejection processing, the printer 11 waits until the user releases the jam of the printing medium M. After releasing the jam of the printing medium M, the user inputs that jam release is completed to the control panel 110. The control panel 110 receives the input of the jam release completion, and transmits a jam release completion signal to the controlling unit 101. The controlling unit 101 receives the jam release completion signal. The controlling unit 101 may receive the jam release completion signal from a sensor or the like other than the control panel 110.

After receiving the jam release completion signal, the controlling unit 101 controls the carriage motor 28*a* to move the carriage 27 to the maintenance unit 130. The controlling unit 101 controls the carriage motor 28*a* to stop the head unit 14 at the emission position CP facing the liquid receiving portion 131. The controlling unit 101 causes the printing head 15 to perform a forced ejection operation, after the head unit 14 is stopped. The forced ejection operation is an operation for causing a predetermined amount of the ink or processing liquid to be ejected from the printing head 15 to the liquid receiving portion 131.

The controlling unit 101 may control the forced ejection operation based on a stop position of the printing head 15 when the jam occurs. The controlling unit 101 may control whether to perform the forced ejection operation or not, based on the stop position of the printing head 15 when the jam occurs. As an example, the controlling unit 101 causes the first printing head 15*a* stopped in the printing region R1 when the jam occurs to perform the forced ejection operation, and does not cause the second printing head 15*b* stopped in the non-printing region R2 to perform the forced ejection operation. The processing liquid attached to the printing medium M is likely to enter the first printing head 15*a* stopped in the printing region R1. The controlling unit 101 causes a coagulate that may occur in the first printing head 15*a* to be ejected by the forced ejection operation. The second printing head 15*b* stopped in the non-printing region R2 is less likely to contact the printing medium M when the jam occurs, and thus the controlling unit 101 does not cause the second printing head 15*b* to perform the forced ejection operation.

The controlling unit 101 may control an ejection amount of the ink or processing liquid during the forced ejection operation, based on the stop position of the printing head 15 when the jam occurs. When the jam occurs, the first printing head 15*a* may be stopped in the printing region R1, and the second printing head 15*b* may be stopped in the non-printing region R2. In this case, the controlling unit 101 may make an ink ejection amount ejected from the first printing head 15*a* different from a processing liquid ejection amount ejected from the second printing head 15*b*. The ink ejection amount corresponds to an example of a liquid ejection amount. The processing liquid ejection amount corresponds to an example of a reaction liquid ejection amount.

The ink ejection amount may be greater or less than the processing liquid ejection amount. The controlling unit 101, by making the ink ejection amount greater than the processing liquid ejection amount, can suppress occurrence of clogging in the first printing head 15*a*, and reduce an ejection amount of the processing liquid ejected by the second printing head 15*b*. The controlling unit 101, by making the ink ejection amount less than the processing liquid ejection amount, can reduce an ejection amount of the ink ejected by the first printing head 15*a*, and suppress occurrence of clogging in the second printing head 15*b* that does not perform the stop position ejection processing.

The printer 11 includes the maintenance unit 130 that accommodates liquid ejected from the head unit 14 by the forced ejection operation. After the jam is released, the controlling unit 101 causes the head unit 14 to perform the forced ejection operation. The ink ejection amount ejected in the forced ejection operation is different from the processing liquid ejection amount.

The printer 11 can suppress consumption of the ink or a reaction liquid and suppress occurrence of clogging.

After the head unit 14 is stopped at the emission position CP facing the liquid receiving portion 131 corresponding to an example of the maintenance unit 130, and the forced ejection operation is performed, the controlling unit 101 moves the head unit 14 to the wiping region WA facing the wiping mechanism 133. After the head unit 14 is moved to the wiping region WA, the controlling unit 101 controls the wiping mechanism 133 and causes the printing head 15 to perform a wiping operation. The wiping operation corresponds to an example of a cleaning operation.

The controlling unit 101 may make the wiping operation different for each printing head 15, based on the stop position of the printing head 15 when the jam occurs. As an example, a pressing portion (not illustrated) that presses the wiping portion 161 includes a plurality of pressing members that press the plurality of printing heads 15, respectively. The controlling unit 101 may make pressing force of each pressing member for pressing the printing head 15 different for each printing head 15. Pressing force for pressing the first printing head 15*a* stopped in the printing region R1 when the jam occurs may be made different from pressing force for pressing the second printing head 15*b* stopped in the non-printing region R2. The pressing force corresponds to an example of a cleaning intensity.

The controlling unit 101 moves the head unit 14 in the +X direction in which the suction mechanism 134 is located, after causing the wiping mechanism 133 to perform the wiping operation on the printing head 15. The controlling unit 101 sequentially moves the plurality of printing heads 15 to a position facing the suction mechanism 134. When the printing head 15 is moved to the position facing the suction mechanism 134, the ink or processing liquid is suctioned by the suction mechanism 134. The controlling unit 101 may perform control for making the suction operation by the suction mechanism 134 different, based on the stop position of the printing head 15 when the jam occurs. The controlling unit 101 makes a suction operation on the first printing head 15*a* stopped in the printing region R1 when the jam occurs different from a suction operation on the second printing head 15*b* stopped in the non-printing region R2. The controlling unit 101 makes a suction amount and a suction pressure of the ink or processing liquid different. The suction amount and suction pressure correspond to examples of the cleaning intensity. The controlling unit 101 may make an ink suction amount that is suctioned from the first printing head 15*a* greater than a processing liquid suction amount that is suctioned from the second printing head 15*b*. The ink suction amount corresponds to an example of a first cleaning intensity. The processing liquid suction amount corresponds to an example of a second cleaning intensity. The first printing head 15*a* is likely to be clogged as compared to the second printing head 15*b*. By making the ink suction amount greater than the processing liquid suction amount, the controlling unit 101 can reduce a possibility of clogging occurrence in the first printing head 15*a*, and reduce a usage amount of the processing liquid. The controlling unit 101 may make the ink suction amount that is suctioned from the first printing head 15*a* less than the processing liquid suction amount that is suctioned from the second printing head 15*b*. When the jam occurs, the first printing head 15*a* performs the stop position ejection processing, and the second printing head 15*b* does not perform the stop position ejection processing. In the first printing head 15*a*, an ink amount that remains in the nozzle 24 is small, and thus occurrence of clogging can be suppressed while the ink suction amount is made less than the processing liquid suction amount.

The printer 11 includes the suction mechanism 134 that cleans the first printing head 15*a* and the second printing head 15*b*. After the jam is released, the controlling unit 101 causes the suction mechanism 134 to perform cleaning, and the ink suction amount that is intensity of cleaning for the first printing head 15*a* is different from the processing liquid suction amount that is intensity of cleaning for the second printing head 15*b*.

The printer 11 changes the cleaning intensity corresponding to a situation of the first printing head 15*a* and the second printing head 15*b*, and thus can suppress clogging in the nozzle 24, and reduce the usage amount of the first ink or processing liquid.

The controlling unit 101 moves the head unit 14 from the position facing the suction mechanism 134 to a position facing the capping mechanism 136. The position facing the capping mechanism 136 is the home position HP of the head unit 14. The head unit 14 is stopped at the home position HP.

What is claimed is:

1. A liquid ejecting device that performs printing by ejecting first liquid onto a medium within a printing region, the liquid ejecting device comprising:

- an ejecting unit including a first ejecting unit configured to eject the first liquid onto the medium, and a second ejecting unit configured to eject a reaction liquid containing a coagulant for coagulating a component in the first liquid onto the medium;
- a transport unit configured to transport the medium;
- a jam detector configured to detect a jam of the medium; and
- a control unit configured to control the ejecting unit and the transport unit, wherein
- when the jam is detected by the jam detector, the control unit
  - stops the transportation of the medium by the transport unit, and
  - ejects before the jam is released, within the printing region, the first liquid, the reaction liquid, or the first liquid and the reaction liquid from the first ejecting unit and the second ejecting unit.

2. The liquid ejecting device according to claim 1, comprising:

a movement unit configured to move the ejecting unit; and a position detector configured to detect a position of the ejecting unit, wherein when the jam is detected by the jam detector, the control unit controls the movement unit to stop movement of the ejecting unit, causes the position detector to detect a stop position of the ejecting unit, and based on the stop position of the ejecting unit detected by the position detector, ejects one of the first liquid or the reaction liquid from the first ejecting unit and the second ejecting unit, and does not eject another one of the first liquid or the reaction liquid.

3. The liquid ejecting device according to claim 2, comprising a maintaining unit configured to receive liquid ejected from the ejecting unit in a forced ejection operation, wherein after the jam is released, the control unit causes the ejecting unit to perform the forced ejection operation, and a liquid ejection amount of the first liquid ejected in the forced ejection operation is different from a reaction liquid ejection amount of the reaction liquid ejected in the forced ejection operation.

4. The liquid ejecting device according to claim 2, comprising a cleaning unit configured to perform cleaning on the first ejecting unit and the second ejecting unit, wherein after the jam is released, the control unit causes the cleaning unit to perform the cleaning, and a first cleaning intensity that indicates an intensity of the cleaning performed on the first ejecting unit is different from a second cleaning intensity that indicates an intensity of the cleaning performed on the second ejecting unit.

5. The liquid ejecting device according to claim 1, wherein the control unit calculates a printing rate when the printing is performed, and adjusts, based on the printing rate, an ejection amount of the first liquid or the reaction liquid ejected when the jam is detected by the jam detector.

6. The liquid ejecting device according to claim 1, wherein the ejecting unit includes a third ejecting unit configured to eject a second liquid different from the first liquid, and the control unit controls whether or not to eject the second liquid from the third ejecting unit, when the jam is detected by the jam detector.

7. The liquid ejecting device according to claim 1, comprising:

a first pressurization mechanism configured to pressurize the first liquid in the first ejecting unit; and a second pressurization mechanism configured to pressurize the reaction liquid in the second ejecting unit, wherein the control unit drives the first pressurization mechanism to eject the first liquid, and drives the second pressurization mechanism to eject the reaction liquid.

8. The liquid ejecting device according to claim 1, comprising:

a supply flow path configured to supply the first liquid to the first ejecting unit;

a return flow path configured to return the first liquid from the first ejecting unit; and a flow mechanism configured to cause the first liquid in the return flow path to flow, wherein the control unit controls the flow mechanism, and stops the flow mechanism when the jam is detected by the jam detector.

9. A liquid ejecting method for a liquid ejecting device performing printing by ejecting liquid onto a medium within a printing region, the liquid ejecting method comprising:

ejecting the liquid onto the medium from a first ejecting unit;

ejecting, from a second ejecting unit onto the medium, a reaction liquid containing a coagulant for coagulating a component in the liquid; and stopping transport of the medium when a jam of the medium is detected, and ejecting the liquid, the reaction liquid, or the liquid and the reaction liquid before the jam is released.

10. The liquid ejecting device according to claim 1, wherein the control unit, ejects onto the medium before the jam is released, the first liquid, the reaction liquid, or the first liquid and the reaction liquid from the first ejecting unit and the second ejecting unit.

* * * * *